(12) United States Patent
Nakamura et al.

(10) Patent No.: US 11,183,730 B2
(45) Date of Patent: Nov. 23, 2021

(54) BATTERY PACK AND ELECTRONIC DEVICE INCLUDING THE SAME

(71) Applicant: MURATA MANUFACTURING CO., LTD., Kyoto (JP)

(72) Inventors: Tsuyoshi Nakamura, Kyoto (JP); Masaaki Sugiyama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 206 days.

(21) Appl. No.: 16/144,667

(22) Filed: Sep. 27, 2018

(65) Prior Publication Data

US 2019/0067655 A1 Feb. 28, 2019

Related U.S. Application Data

(63) Continuation of application No. PCT/JP2017/005690, filed on Feb. 16, 2017.

(30) Foreign Application Priority Data

Apr. 5, 2016 (JP) .............................. JP2016-075846

(51) Int. Cl.
*H01M 50/213* (2021.01)
*H01M 10/613* (2014.01)
(Continued)

(52) U.S. Cl.
CPC ....... *H01M 50/213* (2021.01); *H01M 10/613* (2015.04); *H01M 10/643* (2015.04);
(Continued)

(58) Field of Classification Search
CPC .... H01M 50/20; H01M 50/183; H01M 50/24; H01M 50/213; H01M 50/107; H01M 10/643
See application file for complete search history.

(56) References Cited

U.S. PATENT DOCUMENTS

| 5,977,746 A * | 11/1999 | Hershberger ......... H01M 50/20 320/112 |
| 2003/0082439 A1 | 5/2003 | Sakakibara |
| 2013/0082659 A1* | 4/2013 | Kano .................. H01M 50/213 320/128 |

FOREIGN PATENT DOCUMENTS

| CN | 103117364 | 5/2013 |
| JP | 2001-155702 A | 6/2001 |

(Continued)

OTHER PUBLICATIONS

Machine translation of 2011155702, by EPO (Year: 2001).*
Chinese Office Action dated Nov. 4, 2020, in corresponding Chinese Application No. 201780022477.1.
(Continued)

*Primary Examiner* — Maria Laios
(74) *Attorney, Agent, or Firm* — K&L Gates LLP

(57) ABSTRACT

A battery pack includes a battery block including a battery cell, and a battery holder configured to accommodate the battery cell and having at least a first opening portion; a battery pack case configured to accommodate the battery block and having at least a second opening portion; a first sealant disposed at least between a first peripheral end face of a first terminal portion of the battery cell and the battery holder; and a second sealant disposed at least between a second peripheral end face of a second terminal portion of the battery cell and the battery holder, wherein the first sealant is fixed by the first peripheral end face of the first terminal portion and the battery holder, and the second sealant is fixed by the second peripheral end face of the second terminal portion and the battery holder.

11 Claims, 14 Drawing Sheets

(51) Int. Cl.
*H01M 10/643* (2014.01)
*H01M 50/20* (2021.01)
*H01M 50/56* (2021.01)
*H01M 50/107* (2021.01)
*H01M 50/183* (2021.01)
*H01M 50/502* (2021.01)
*H01M 50/24* (2021.01)

(52) U.S. Cl.
CPC ....... *H01M 50/107* (2021.01); *H01M 50/183* (2021.01); *H01M 50/20* (2021.01); *H01M 50/502* (2021.01); *H01M 50/56* (2021.01); *H01M 50/24* (2021.01); *H01M 2220/30* (2013.01)

(56) References Cited

FOREIGN PATENT DOCUMENTS

| | | |
|---|---|---|
| JP | 2003-142051 A | 5/2003 |
| JP | 2006-156171 A | 6/2006 |
| JP | 2008-166208 A | 7/2008 |
| JP | 2008-251471 A | 10/2008 |
| JP | 2011-049014 A | 3/2011 |
| JP | 2013-073864 A | 4/2013 |
| JP | 2014-072020 A | 4/2014 |
| WO | 2014/030339 A2 | 2/2014 |

OTHER PUBLICATIONS

International Search Report and Written Opinion issued in connection with International Patent Application No. PCT/JP2017/005690, dated May 23, 2017. (10 pages).

\* cited by examiner

BATTERY PACK AND ELECTRONIC DEVICE INCLUDING THE SAME

CROSS REFERENCE TO RELATED APPLICATIONS

The present application is a continuation of PCT patent application no. PCT/JP2017/005690, filed on Feb. 16, 2017, which claims priority to Japanese patent application no. JP2016-075846 filed on Apr. 5, 2016, the entire contents of which are being incorporated herein by reference.

BACKGROUND

The present technology generally relates to a battery pack. More specifically, the present technology relates to a battery pack applicable to an electronic device, an electric vehicle, a power tool, and the like.

The battery pack is formed by accommodating a battery such as a lithium-ion battery and one or a plurality of battery blocks including a battery holder holding a plurality of the batteries in an exterior case. This battery pack is used for electronic devices such as personal computers and portable communication terminals, vehicles equipped with electric motors as driving sources, electric machines such as rammers and lawn mowers, and the like.

For example, a battery pack includes: an exterior case in which one or more hole portions are formed; a battery cell having a positive electrode terminal portion formed on one end face and a negative electrode terminal portion formed on the other end face; a battery holder formed with a plurality of battery cell accommodating portions for accommodating the battery cell; and a metal plate connected to the battery holder and formed with a terminal contact portion. One end of the battery cell accommodating portion is opened, an end portion having an opening is formed on the other end of the battery cell accommodating portion, an elastic body having an opening is formed between one end face of the battery cell and the end portion of the battery cell accommodating portion, a predetermined section of the elastic body is sandwiched by an end face near the positive electrode terminal portion and an inner surface of the end portion, and a section of the elastic body exposed from the opening of the battery cell accommodating portion is sandwiched by the positive electrode terminal portion and the metal plate near the terminal contact portion.

SUMMARY

In the battery pack described above, the elastic body is disposed only between the positive electrode terminal portion of the battery cell and the battery holder, and hence the entry of water, dust, and the like into the battery cell can be prevented, but the entry of water, dust, and the like into spaces among a substrate, a terminal portion tab, the exterior case, and a battery cell holder cannot be prevented, which has been problematic.

As a result, the water or the like having entered causes deterioration in the substrate and terminal portion tab, and further causes deterioration in the entire battery pack, which has been problematic.

Therefore, one of an object of the present technology to provide a battery pack capable of preventing water from entering inside.

According to an embodiment of the present technology, a battery pack is provided. The battery pack at least including: a battery block including a battery cell and a battery holder configured to accommodate the battery cell, wherein the battery holder includes at least a first opening portion; a battery pack case configured to accommodate the battery block and having at least a second opening portion; a first sealant disposed at least between a first peripheral end face of a first terminal portion of the battery cell and the battery holder; and a second sealant disposed at least between a second peripheral end face of a second terminal portion of the battery cell and the battery holder, wherein the first sealant is fixed by the first peripheral end face of the first terminal portion and the battery holder, and the second sealant is fixed by the second peripheral end face of the second terminal portion and the battery holder.

In the battery pack according to an embodiment of the present technology, at least a first opening portion in the battery holder and the at least a second opening portion in the battery pack case may be disposed to face each other.

Further, in the battery pack according to an embodiment of the present technology, a first opening portion in the battery holder may be formed in a bottom surface of the battery holder, a second opening portion in the battery pack case may be formed in a bottom surface of the battery pack case, and the first opening portion and the second opening portion may be disposed to face each other, and a third opening portion in the battery holder may be formed in at least one side surface of the battery holder, a fourth opening portion in the battery pack case may be formed in at least one side surface of the battery pack case, and the third opening portion and the fourth opening portion may be disposed to face each other.

Further, in the battery pack according to an embodiment of the present technology, the first sealant and the second sealant may include elastic bodies having an opening.

Further, in the battery pack according to an embodiment of the present technology, the first sealant and the second sealant may be potting agents.

Further, in the battery pack according to an embodiment of the present technology, a clearance may be provided between the battery cell and the battery holder.

Further, the battery pack according to an embodiment of the present technology may include a gasket disposed between the battery holder and the battery pack case.

Further, in the battery pack according to an embodiment of the present technology, the gasket may be disposed between the battery holder and a bottom surface of the battery pack case.

Further, in the battery pack according to an embodiment of the present technology, a first opening portion in the battery holder may be formed in a bottom surface of the battery holder, a second opening portion in the battery pack case may be formed in a bottom surface of the battery pack case, and the first opening portion and the second opening portion may be disposed to face each other, a third opening portion in the battery holder may be formed in at least one side surface of the battery holder, a fourth opening portion in the battery pack case may be formed in at least one side surface of the battery pack case, and the third opening portion and the fourth opening portion may be disposed to face each other, and the gasket may be disposed between the battery holder and the bottom surface of the battery pack case and may further be disposed between the battery holder and at least one side surface of the battery pack case.

Further, in the battery pack according to an embodiment of the present technology, the battery pack case may include a fitting surface, and a first O-ring disposed on the fitting surface of the battery pack case.

Further, in the battery pack according to an embodiment of the present technology, the battery holder may include a fitting surface, and a second O-ring disposed on the fitting surface of the battery holder.

Further, in the battery pack according to an embodiment of the present technology, the second O-ring includes a plurality of O-rings, and at least two O-rings may be arranged separately.

Further, in the battery pack according to an embodiment of the present technology, at least a part of the battery cell may be covered with a coating agent.

Further, the battery pack according to an embodiment of the present technology may include: a battery cell group including a plurality of battery cells; a first elastic sheet including a plurality of first elastic bodies each having an opening between a first end of the battery cell group and the battery holder; and a second elastic sheet including a plurality of elastic bodies each having an opening between a second end of the battery cell group and the battery holder.

Further, the battery pack according to an embodiment of the present technology may include a gasket disposed between the battery holder and the battery pack case, wherein the battery holder may include a fitting surface, and a second O-ring disposed on the fitting surface of the battery holder, and the gasket and the second O-ring may overlap without contacting each other.

Further, the battery pack according to an embodiment of the present technology may include a gasket disposed between the battery holder and the battery pack case, wherein the battery holder may include a fitting surface, and a second O-ring disposed on the fitting surface of the battery holder, and the gasket and the second O-ring may overlap and contact with each other.

According to another embodiment of the present technology, an electronic device is also provided. The electronic device includes a battery pack and is configured to be supplied with electric power from the battery pack, the battery pack at least including a battery block including a battery cell and a battery holder configured to accommodate the battery cell, wherein the battery holder includes at least a first opening portion, a battery pack case configured to accommodate the battery block and having at least a second opening portion, a first sealant disposed at least between a first peripheral end face of a first terminal portion of the battery cell and the battery holder, and a second sealant disposed at least between a second peripheral end face of a second terminal portion of the battery cell and the battery holder, wherein the first sealant is fixed by the first peripheral end face of the first terminal portion and the battery holder, and the second sealant is fixed by the second peripheral end face of the other terminal portion and the battery holder.

According to an embodiment the present technology, it is possible to prevent water from entering the inside of the battery pack, and as a result, it is possible to prevent not only deterioration in the battery cell due to immersion but also deterioration in the substrate, the terminal portion tab, the exterior case, and the battery cell holder due to immersion.

It should be understood that the effects described here are not necessarily limited, and other suitable properties relating to the present technology may be realized and as further described.

DETAILED DESCRIPTION

Figure 1:
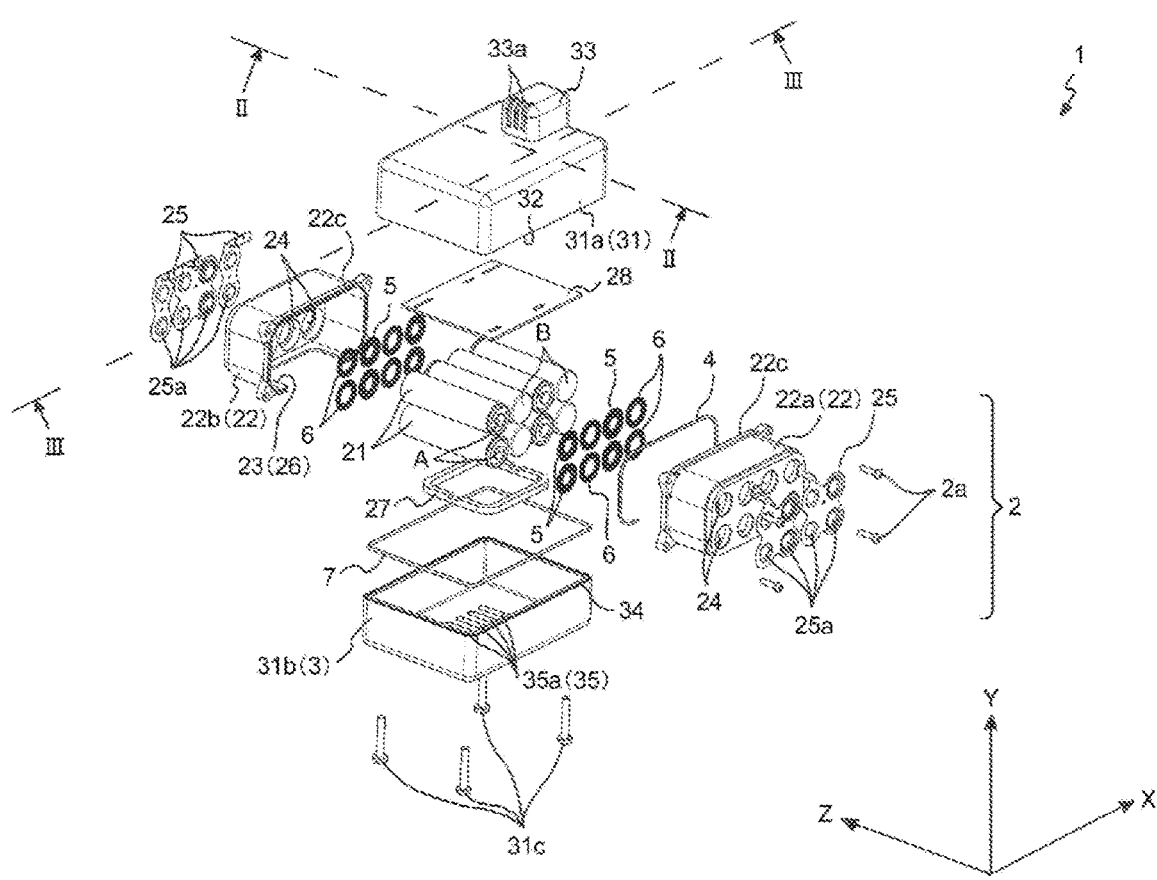
FIG. 1 is an exploded perspective view showing an embodiment of a battery pack according to the present technology.

The present technology generally relates to a battery pack. More specifically, the present technology relates to a battery pack applicable to an electronic device, an electric vehicle, a power tool, and the like. As described herein, the present disclosure will be described based on examples with reference to the drawings, but the present disclosure is not to be considered limited to the examples, and various numerical values and materials in the examples are considered by way of example.

A first embodiment of the battery pack according to the present technology will be described with reference to FIGS. 1 to 9. A battery pack 1 mainly includes a battery block 2 to be a power supply, and a battery pack case 3 accommodating the battery block 2. Each configuration will be described below.

The battery block 2 includes a battery cell 21, and a battery holder 22 that holds the battery cell 21.

In the battery pack 1 according to the present technology, two battery cells 21 adjacent to each other in a direction vertical to a longitudinal direction of the battery pack 1 (a direction of an arrow Y in FIG. 1) are defined as one set (hereinafter referred to as "a cell group"), and the battery cells 21 are arranged so as to form four rows with respect to the battery holder 22 to constitute a battery cell group. That is, in the battery pack 1, a total of eight battery cells 21 are held by the battery holder 22.

In each cell group, terminal portions of the respective battery cells 21 are oriented in the same direction, and furthermore, cell groups adjacent to each other along the longitudinal direction of the battery pack 1 (a direction of an arrow X in FIG. 1) are arranged such that the terminal portions of the respective battery cells 21 are oriented in different directions. In the following description, in each battery cell 21, a terminal portion formed in a convex shape is referred to as "one terminal portion A", and a terminal portion formed in a planar shape is referred to as "the other terminal portion B."

It should be understood that the orientation of the terminal portions of each battery cell 21 in the battery cell group shown in FIG. 1 is merely an example, and can be changed appropriately.

The battery cell 21 according to the present technology is not particularly limited, and a known battery can be used. Examples of the battery cell 21 include primary batteries such as manganese dry batteries, alkaline manganese dry batteries, lithium primary batteries, secondary batteries such as nickel-cadmium batteries, nickel-metal hydride batteries, nickel-zinc batteries, lead batteries, lithium secondary batteries, lithium ion secondary batteries, lithium ion polymer secondary battery, and some other battery. In the battery pack according to the present technology, the lithium ion secondary battery is preferably used.

In the battery pack 1 according to an embodiment of the present technology, the number, the connection mode, and the like of the battery cells 21 can be changed appropriately in accordance with the use of the battery pack 1.

In the battery pack 1 shown in FIG. 1, the battery holder 22 includes a pair of half bodies 22a, 22b, and the pair of half bodies 22a, 22b are fitted to each other using the fixing member 2a to complete the battery holder 22.

Each of the half bodies 22a, 22b is formed as a casing in which the insertion surface of the battery cell group is open, and a rectangular window portion 23 is formed in a surface. That is, each of the half bodies 22a, 22b has a substantially inverted U shape in cross section. Since FIG. 1 is a perspective view, the window portion 23 of the half body 22a is not shown.

A material for each of the half bodies 22a, 22b is not particularly limited, and includes, for example, an insulating member such as plastics. The material for each of the half bodies 22a, 22b may be a material containing metal powder or carbon and having high thermal conductivity. By using such a material, it is possible to efficiently release heat generated from each battery cell 21 to the outside. Alternatively, the material for each of the half bodies 22a, 22b may be a material containing glass fiber or carbon filler. In such a case, the mechanical strength of each of the half bodies 22a, 22b can be increased.

In each of the half bodies 22a, 22b, a terminal portion exposure hole 24 is formed so as to penetrate the surface of each battery cell 21, which faces the terminal portions A, B. As described above, the eight battery cells 21 are provided in the entire battery pack 1, and hence a total of eight terminal portion exposure holes 24 are provided.

Further, the respective half bodies 22a, 22b are provided with terminal portion tabs 25 for electrically connecting the respective battery cells 21. Specifically, a total of two terminal portion tabs 25 are provided on the half body 22a, and four terminal portion joints 25a to be inserted into the terminal portion exposure hole 24 are formed in each terminal portion tab 25.

Meanwhile, a total of three terminal portion tabs 25 are provided on the half body 22b, and four battery cells 21 arranged at the center of the battery pack 1 in the longitudinal direction (the direction of the arrow X in FIG. 1) are electrically connected by a single terminal portion tab 25. Furthermore, in the half body 22b, two battery cells 21 provided at each longitudinal end of the battery pack 1 are electrically connected by a single terminal portion tab 25.

The respective half bodies 22a, 22b are formed with the mutually opposed end faces taken as fitting surfaces 22c formed in a substantially inverted U shape, and by joining the fitting surfaces 22c, 22c to each other, a space is formed for accommodating the battery cell group between the pair of half bodies 22a, 22b.

The window portion 23 of the half body 22a and the window portion 23 of the half body 22b are combined to form a first opening portion 26, and a part of the battery cell group is exposed to the outside of the battery holder 22 through the first opening portion 26. In addition, each of the half bodies 22a, 22b is combined so as to sandwich a substantially O-shaped gasket 27 between the window portion 23 of the half body 22a and the window portion 23 of the half body 22b, and the gasket 27 is disposed so as to cover the peripheral edge of the first opening portion 26.

With the battery holder 22 including the gasket 27, the airtightness and liquid tightness are ensured.

Further, when the half body 22a and the half body 22b are fitted together, an O-ring 4 is provided as a sealant between the fitting surface 22c of the half body 22a and the fitting surface 22c of the half body 22b. That is, the O-ring 4 corresponds to the second O-ring according to the present technology. As described above, since each of the half bodies 22a, 22b is formed in the substantially inverted U shape in cross section, the O-ring 4 is also formed in the substantially inverted U shape.

In an assembled state of the battery pack 1, the O-ring 4 is disposed in an elastically deformed state between the fitting surface 22c of the half body 22a and the fitting surface 22c of the half body 22b. As a result, the O-ring 4 can prevent foreign matters such as water and dust from entering the battery holder 22.

A material for the O-ring 4 is not particularly limited, and for example, may be sufficient as long as being elastically deformable, and such rubber materials as follows are used: natural rubber, synthetic natural rubber, silicon, isoprene rubber, butadiene rubber, styrene rubber, styrene butadiene rubber, butyl rubber, ethylene-propylene rubber, nitrile rubber, chlorosulfonated polyethylene rubber, acrylic rubber, urethane rubber, silicone rubber, fluorine rubber, and polysulfide rubber.

In addition, the O-ring 4 can improve the waterproof effect when the rubber-based material contains an inorganic filler. Examples of such inorganic fillers include silica, alumina, calcium carbonate, titanium oxide, mica, zeolite, and activated carbon.

In addition, a substrate 28 is also accommodated in the accommodation space formed by the half body 22a and the half body 22b. The substrate 28 is to be connected to the battery cell 21. Here, when a lithium ion secondary battery having a higher energy density is used as the battery cell 21, the substrate 28 is preferably a protection circuit board (PCM) including a protection circuit.

In the battery pack 1 according to an embodiment of the present technology, a first sealant 5 and a second sealant 6 are provided between each of the half bodies 22a, 22b and each battery cell 21.

Specifically, the first sealant 5 is fixed between each of the half bodies 22a, 22b and one terminal portion A of each battery cell 21, and the second sealant 6 is fixed between each of the half bodies 22a, 22b and the other terminal portion B of each battery cell 21.

Figure 4:
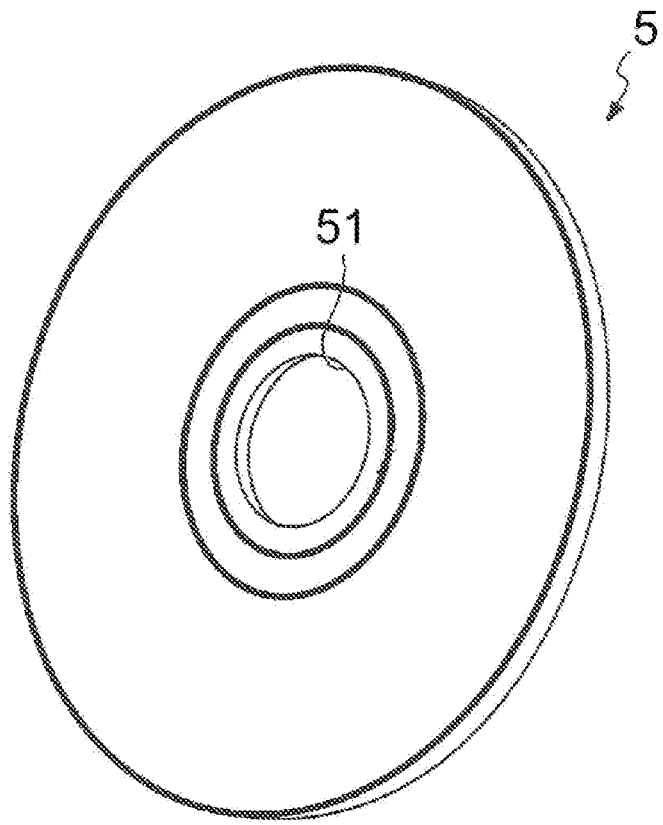
FIG. 4 is a perspective view showing an example of a first sealant included in the battery pack according to an embodiment of the present technology.
Figure 5:
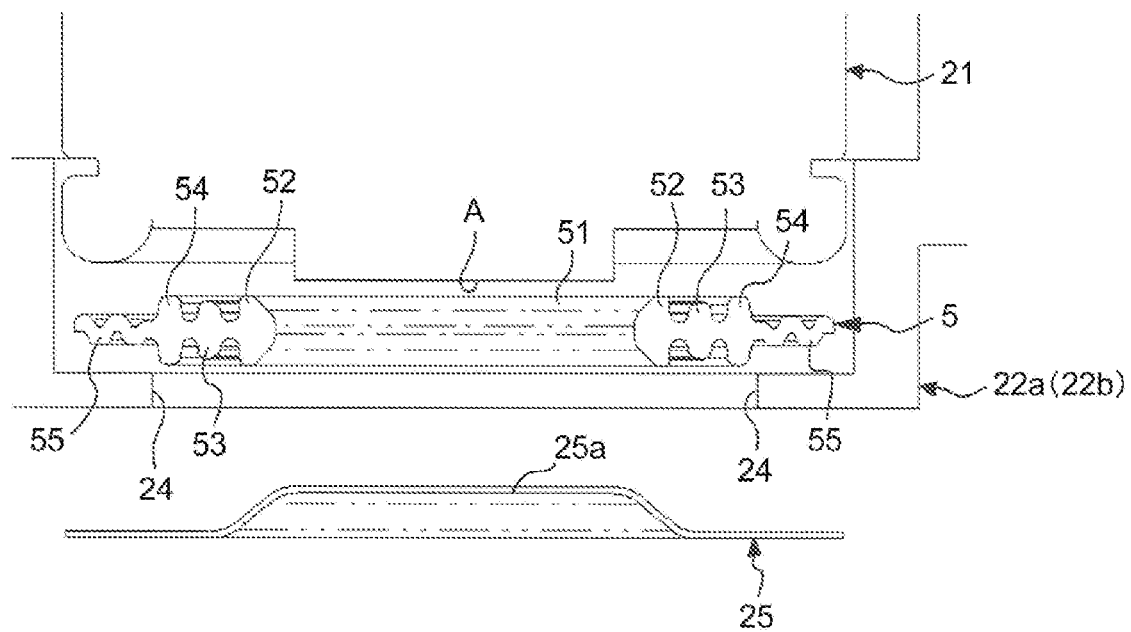
FIG. 5 is an exploded view showing the relationship among a terminal portion tab, a first sealant, and one terminal portion in the battery pack shown in FIG. 1.
Figure 6:
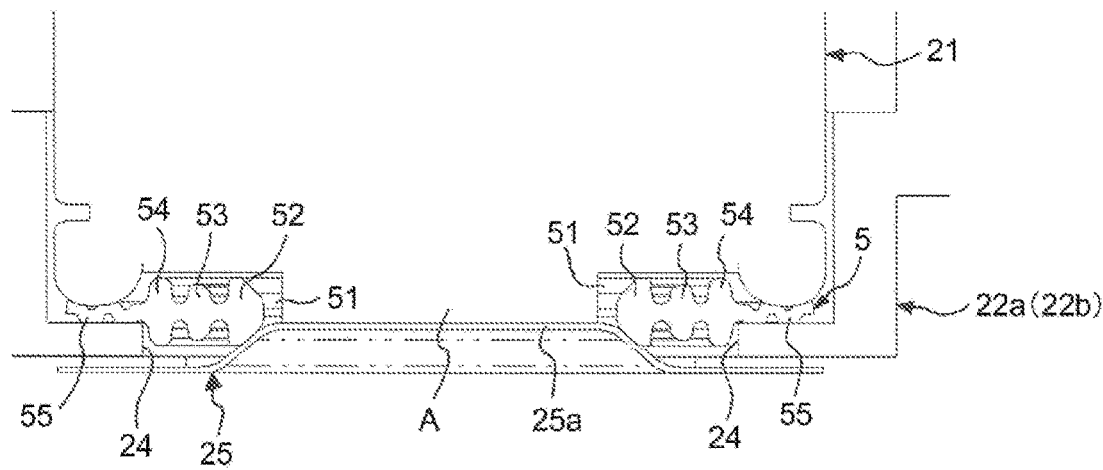
FIG. 6 is an exploded view showing the joining relationship among the terminal portion tab, the first sealant, and one terminal portion in the battery pack shown in FIG. 1.

The first sealant 5 will be described with reference to FIGS. 4 to 6. FIG. 4 shows the outer appearance of the first sealant 5 in a simplified manner, and FIGS. 5 and 6 show the detailed sectional shape of the first sealant 5. The first sealant 5 has a circular hole 51 at the center, and is formed in a substantially disc shape. One terminal portion A is inserted into the hole 51, and the inner diameter of the hole 51 is formed to be the same as or slightly smaller than the outer diameter of the terminal portion A. That is, the one terminal portion A is press-fitted into the hole 51.

Further, the first sealant 5 is formed with an annular first protruding portion 52 that goes around the peripheral edge of the hole 51, and a second protruding portion 53 is annularly formed adjacent to the first protruding portion 52. In addition, a third protruding portion 54 is annularly formed adjacent to the second protruding portion 53. As shown in FIG. 5, the protruding portions 52, 53, 54 are provided at predetermined intervals, and in the first sealant 5, the shape from the first protruding portion 52 to the third protruding portion 54 in cross section is formed substantially in a wave shape.

On the outer diameter side of the third protruding portion 54, a wave-like portion 55 is formed in which annular protrusions are regularly arranged along the radial direction of the first sealant 5.

As shown in FIGS. 5 and 6, the first sealant 5 with the above configuration is fixed between the peripheral end face of one terminal portion A of each battery cell 21 and each of the half bodies 22a, 22b.

As described herein, a total of eight battery cells 21 are held by the battery holder 22, and the terminal portion of each battery cell 21 is provided in a specific orientation. For this reason, a total of four first sealants 5 are provided between the battery cell group and each of the half bodies 22a, 22b (cf. FIG. 1).

In the assembled state of the battery pack 1, the terminal portion A and the terminal portion joint 25a of the terminal portion tab 25 are inserted into the hole 51, and the terminal portion A and the terminal portion joint 25a are joined.

In addition, the first protruding portion 52, the second protruding portion 53, and the third protruding portion 54 are inserted into the terminal portion exposure holes 24 of each of the half bodies 22a, 22b, and the outer peripheral surface of the third protruding portion 54 is brought into close contact with the inner peripheral surface of the terminal portion exposure hole 24. Further, in the assembled state of the battery pack 1, the first protruding portion 52, the second protruding portion 53, and the third protruding portion 54 are sandwiched between the peripheral end face of the terminal portion A and the terminal portion tab 25 so as to be pressurized thereby. In addition, the wave-like portion 55 is sandwiched between the peripheral end faces of the terminal portion A and each of the half bodies 22a, 22b so as to be pressurized thereby.

Such a first sealant 5 has elasticity, and can be deformed in accordance with pressure from the outside. A material for the first sealant 5 is not particularly limited, and such rubber materials as follows are used: natural rubber, synthetic natural rubber, silicon, isoprene rubber, butadiene rubber, styrene rubber, styrene butadiene rubber, butyl rubber, ethylene-propylene rubber, nitrile rubber, chlorosulfonated polyethylene rubber, acrylic rubber, urethane rubber, silicone rubber, fluorine rubber, and polysulfide rubber.

In addition, the first sealant 5 can improve the waterproof effect when the rubber-based material contains an inorganic filler. Examples of such inorganic fillers include silica, alumina, calcium carbonate, titanium oxide, mica, zeolite, and activated carbon.

Further, as the material for the first sealant 5, a thermally conductive resin such as an epoxy resin, a phenol resin, or a silicone resin can be used, and in this case, it is possible to provide the first sealant 5 with a heat dissipating effect.

Next, the second sealant 6 will be described with reference to FIGS. 7 to 9.

Figure 7:
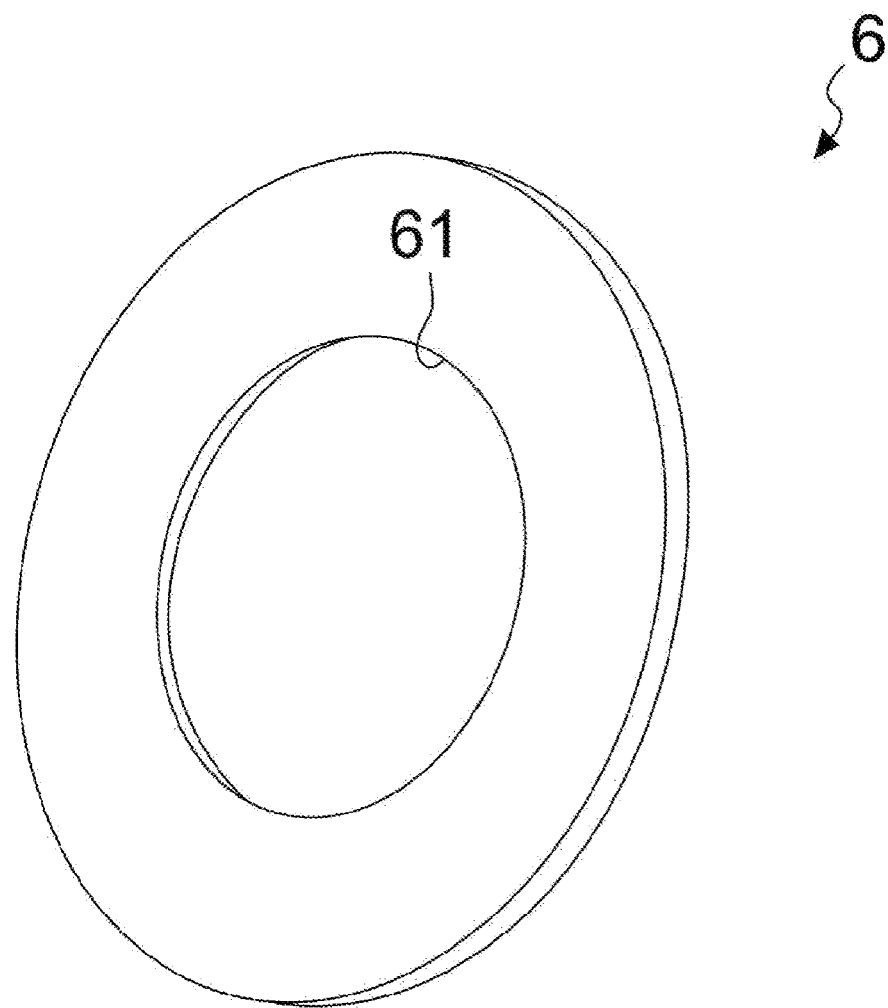
FIG. 7 is a perspective view showing an example of a second sealant included in the battery pack according to an embodiment of the present technology.
Figure 8:
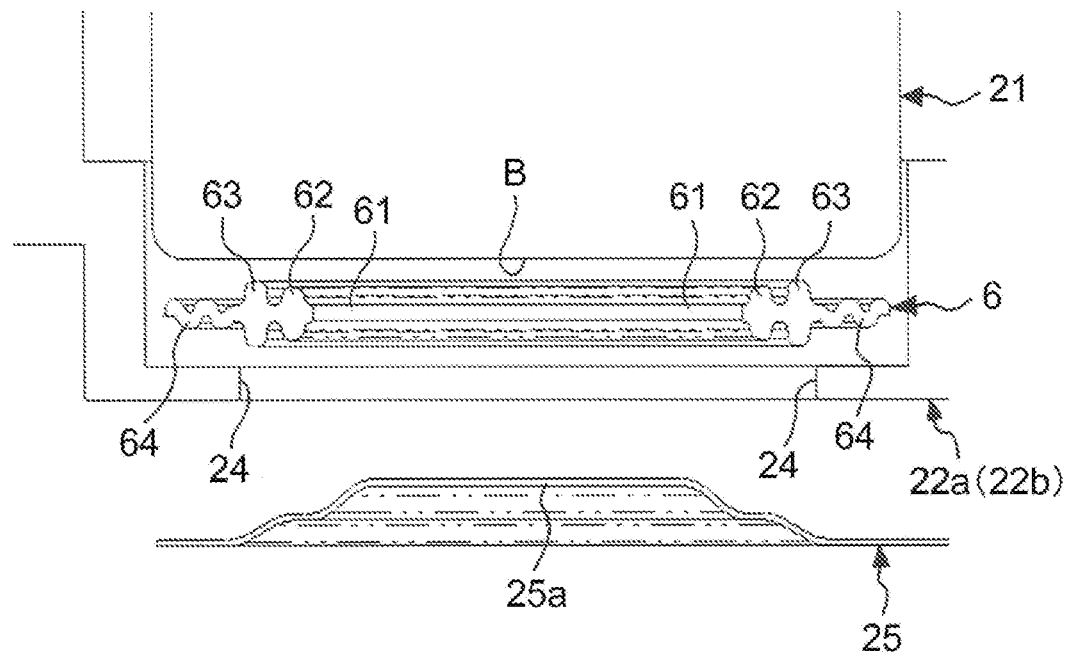
FIG. 8 is an exploded view showing the relationship between the terminal portion tab, the second sealant, and one terminal portion in the battery pack shown in FIG. 1.
Figure 9:
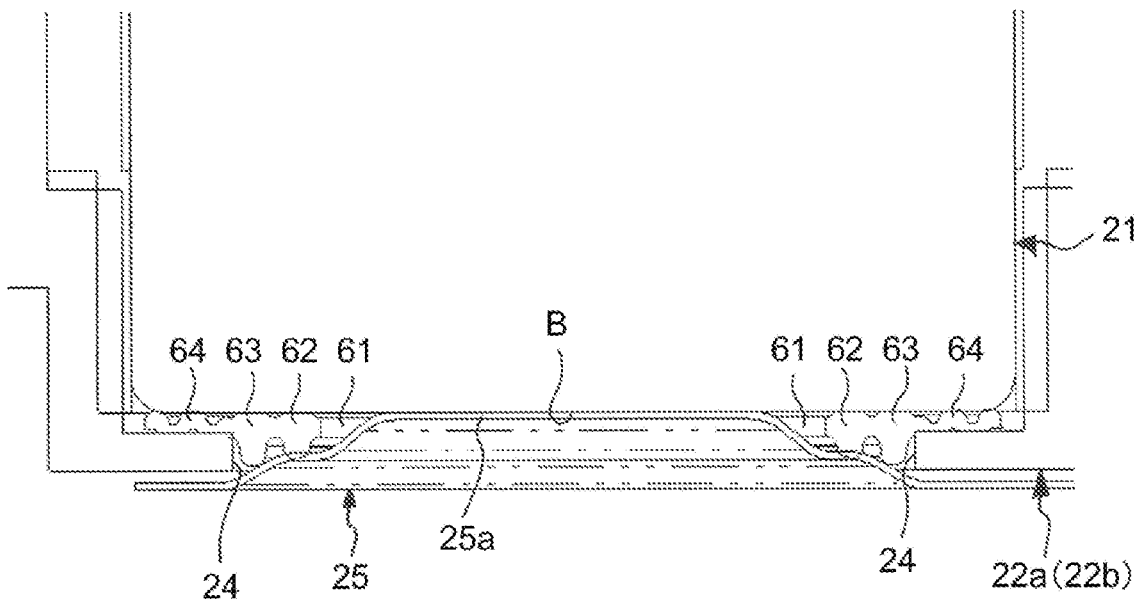
FIG. 9 is an exploded view showing the joining relationship among the terminal portion tab, the second sealant, and one terminal portion in the battery pack shown in FIG. 1.

FIG. 7 shows the outer appearance of the second sealant 6 in a simplified manner, and FIGS. 8 and 9 show the detailed sectional shape of the second sealant 6.

The second sealant 6 has a circular hole 61 at the center, and is formed in a substantially disc shape. The hole 61 is provided corresponding to the other terminal portion B.

Further, the second sealant 6 is formed with an annular first protruding portion 62 that goes around the peripheral edge of the hole 61, and a second protruding portion 63 is annularly formed adjacent to the first protruding portion 62. As shown in FIG. 8, the protruding portions 62, 63 are provided at predetermined intervals, and in the second sealant 6, the shape from the first protruding portion 62 to the second protruding portion 63 in cross section is formed substantially in a wave shape.

On the outer diameter side of the second protruding portion 63, a wave-like portion 64 is formed in which annular protrusions are regularly arranged along the radial direction of the second sealant 6.

As shown in FIGS. 8 and 9, the second sealant 6 with the above configuration is fixed between the peripheral end face of the other terminal portion B of each battery cell 21 and each of the half bodies 22a, 22b.

As described above, a total of eight battery cells 21 are held by the battery holder 22, and the terminal portion of each battery cell 21 is provided in a specific orientation. Therefore, a total of four second sealants 6 are provided between the battery cell group and each of the half bodies 22a, 22b.

In the assembled state of the battery pack 1, the first protruding portion 62 and the second protruding portion 63 are inserted into the terminal portion exposure holes 24 of each of the half bodies 22a, 22b, and the outer peripheral surface of the second protruding portion 63 is brought into close contact with the inner peripheral surface of the terminal portion exposure hole 24. The first protruding portion 62 and the second protruding portion 63 are sandwiched between the peripheral end face of the terminal portion B and the terminal portion tab 25 so as to be pressurized thereby. In addition, the wave-like portion 64 is sandwiched between the peripheral end faces of the terminal portion B and the half bodies 22a, 22b so as to be pressurized thereby.

In the assembled state of the battery pack 1, the terminal portion joint 25a of the terminal portion tab 25 is inserted into the hole 61, and as a result, the terminal portion B is joined to the terminal portion joint 25a via the hole 61.

Such a second sealant 6 has elasticity, and can be deformed according to pressure from the outside. A material for the second sealant 6 is not particularly limited, and such rubber materials as follows are used: natural rubber, synthetic natural rubber, silicon, isoprene rubber, butadiene rubber, styrene rubber, styrene butadiene rubber, butyl rubber, ethylene-propylene rubber, nitrile rubber, chlorosulfonated polyethylene rubber, acrylic rubber, urethane rubber, silicone rubber, fluorine rubber, and polysulfide rubber.

In addition, the second sealant 6 can improve the waterproof effect when the rubber-based material contains an inorganic filler. Examples of such inorganic fillers include silica, alumina, calcium carbonate, titanium oxide, mica, zeolite, and activated carbon.

Further, as the material for the second sealant 6, a thermally conductive resin such as an epoxy resin, a phenol resin, or a silicone resin can be used, and in this case, it is possible to provide the first sealant 5 with a heat dissipating effect.

In the battery block 2 including the battery cells 21 and the battery holder 22, the first sealant 5 and the second sealant 6 are fixed between the terminal portions A, B of each battery cell 21 and the battery holder 22. While no clearance is provided between the terminal portion of each battery cell 21 and the battery holder 22, a clearance is provided between the outer side surface of each battery cell 21 other than the terminal portion and the battery holder 22. As a result, even if each battery cell 21 generates heat, the heat is released.

The battery block 2 including the battery cells 21 and the battery holder 22 is accommodated in the battery pack case 3.

The battery pack case 3 is completed by fitting a pair of half bodies 31a, 31b using a fixing member 31c.

The half body 31a is formed as a casing with one surface open, and the surface facing the half body 31b is formed as a fitting surface 32. A heat radiation portion 33 is formed on the upper surface of the half body 31a. Three slits 33a are formed in the heat radiation portion 33 so that heat generated from the battery cells 21 accommodated therein is released from each slit 33a.

Although the three slits 33a are provided in the battery pack 1 shown in FIG. 1, the number of the slits 33a is not particularly limited, and may be increased or decreased appropriately.

Next, the half body 31b will be described. Similarly to the half body 31a, the half body 31b is formed as a casing with one surface open, and the surface facing the half body 31a is formed as a fitting surface 34.

A second opening portion 35 is formed in the bottom surface of the half body 31b that faces the half body 31a. The second opening portion 35 has a plurality of slits 35a, and each of the slits 35a is arranged at predetermined intervals along the longitudinal direction of the battery pack 1 (the direction of the arrow X in FIG. 1). Further, each of the slits 35a is cut along the width direction of the battery pack 1 (a direction of an arrow Z in FIG. 1).

Figure 2:
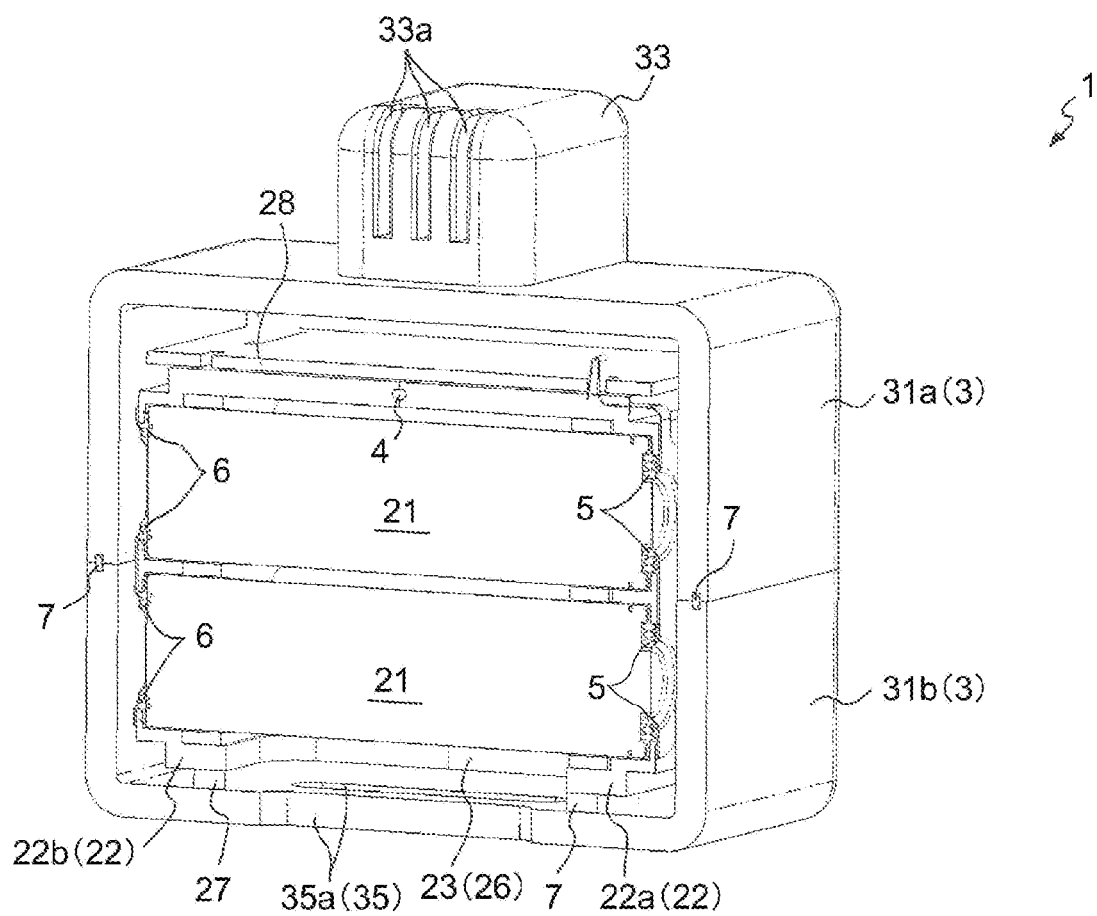
FIG. 2 is a sectional view taken along a line II-II shown in FIG. 1.
Figure 3:
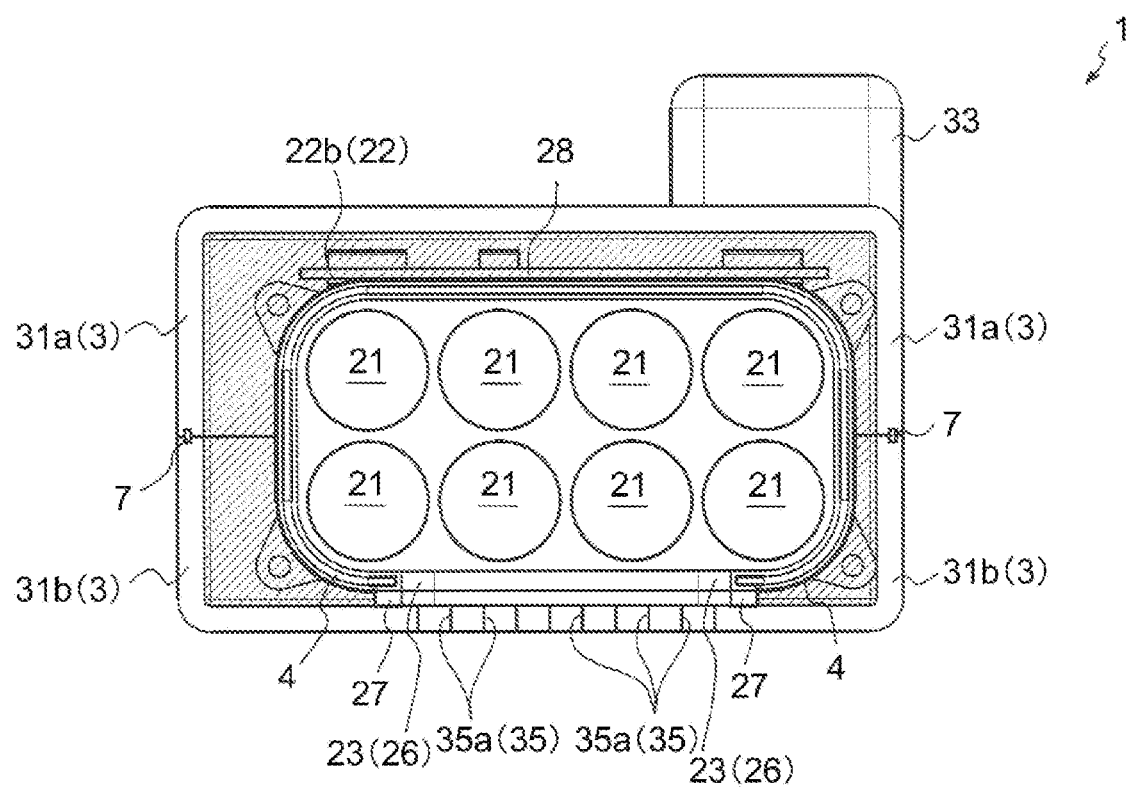
FIG. 3 is a sectional view taken along a line III-III shown in FIG. 1.

In the assembled state of the battery pack 1, such a second opening portion 35 faces the first opening portion 26 in a direction vertical to the longitudinal direction of the battery pack 1, and the second opening portion 35 is provided at the center of the opposed surface of the half body 31b (cf. FIGS. 2 and 3).

That is, in the assembled state of the battery pack 1, a part of each battery cell 21 is exposed to the outside of the battery pack 1 through the first opening portion 26 and the second opening portion 35. Further, the gasket 27 is disposed between the battery holder 22 and the bottom surface of the battery pack case 3.

Note that the configuration of the second opening portion 35 is not particularly limited, and may be formed as a single window portion with no slit 35a provided therein. Although five slits 35a are formed in the drawing, the number of the slits 35a is also not particularly limited.

The half body 31a and the half body 31b are combined using a first O-ring 7. Specifically, the first O-ring 7 is disposed between the fitting surface 32 of the half body 31a and the fitting surface 34 of the half body 31b, and is formed in the substantially O shape similarly to each of the fitting surfaces 32, 34.

In the assembled state of the battery pack 1, the first O-ring 7 is disposed in an elastically deformed state between the fitting surface 32 of the half body 31a and the fitting surface 34 of the half body 31b. As a result, the first O-ring 7 can prevent foreign matters such as water and dust from entering into the battery pack case 3.

A material for the first O-ring 7 is not particularly limited, and for example, may be sufficient as long as being elastically deformable, and such rubber materials as follows are used: natural rubber, synthetic natural rubber, silicon, isoprene rubber, butadiene rubber, styrene rubber, styrene butadiene rubber, butyl rubber, ethylene-propylene rubber, nitrile rubber, chlorosulfonated polyethylene rubber, acrylic rubber, urethane rubber, silicone rubber, fluorine rubber, and polysulfide rubber.

In addition, the first O-ring 7 can improve the waterproof effect when the rubber-based material contains an inorganic filler. Examples of such inorganic fillers include silica, alumina, calcium carbonate, titanium oxide, mica, zeolite, and activated carbon.

In the battery pack 1 according to an embodiment of the present technology configured as described above, the first O-ring 7 is provided between the half body 31a and the half body 31b constituting the battery pack case 3, the first sealant 5 and the second sealant 6 are fixed between the terminal portions A, B of each battery cell 21 and the battery holder 22, and further, the second O-ring 4 is provided between the half body 22a and the half body 22b constituting the battery holder 22.

Therefore, even in a use environment in which foreign matters such as water and dust exist, it is possible to prevent the foreign matter, particularly water, from entering into the battery pack case 3 and the battery holder 22.

As a result, it is possible to prevent not only deterioration in the battery cell 21 in the battery block 2, but also deterioration in the terminal portion tab 25 accommodated in the battery pack case 3 and deterioration in the substrate 28 accommodated in the battery block 2 due to immersion. This can lead to extension of the life of the battery pack 1.

Moreover, in the battery pack 1 according to the present technology, a part of each battery cell 21 is exposed to the outside of the battery pack 1 through the first opening portion 26 and the second opening portion 35. Therefore, even if the battery cell 21 generates heat by use, the heat generated from each battery cell 21 can be released to the outside of the battery pack 1. As a result, it is possible to prevent deterioration in the battery cell 21, and further, deterioration in the battery pack 1, due to heat generation.

That is, the battery pack 1 according to the present technology achieves both a waterproof function by the first O-ring 7, the first sealant 5, the second sealant 6, and the second O-ring 4, and a heat dissipation function by the first opening portion 26 and the second opening portion 35.

In the battery pack 1 according to the first embodiment, although the first opening portion 26 is formed in the bottom surface side of the battery holder 22 and the second opening portion 35 is formed in the bottom surface side of the battery pack case 3, the opening portion according to the present technology may only be formed in at least one surface of the battery holder 22 and the battery pack case 3, and the formed position thereof is not particularly limited.

Next, a second embodiment of the battery pack according to the present technology will be described with reference to FIG. 10. A battery pack 101 according to the second embodiment differs from the battery pack 1 according to the first embodiment in that the first sealant 5 and the second sealant 6 are not formed in the substantially disc shape and are coating agents. Meanwhile, the other configurations are the same as those of the battery pack 1 according to the first embodiment, so that the same reference symbols are given, and the description thereof will be omitted.

In the battery pack 101 according to the present technology, the battery cell group including the plurality of battery cells 21 is covered with a coating agent.

Figure 10:
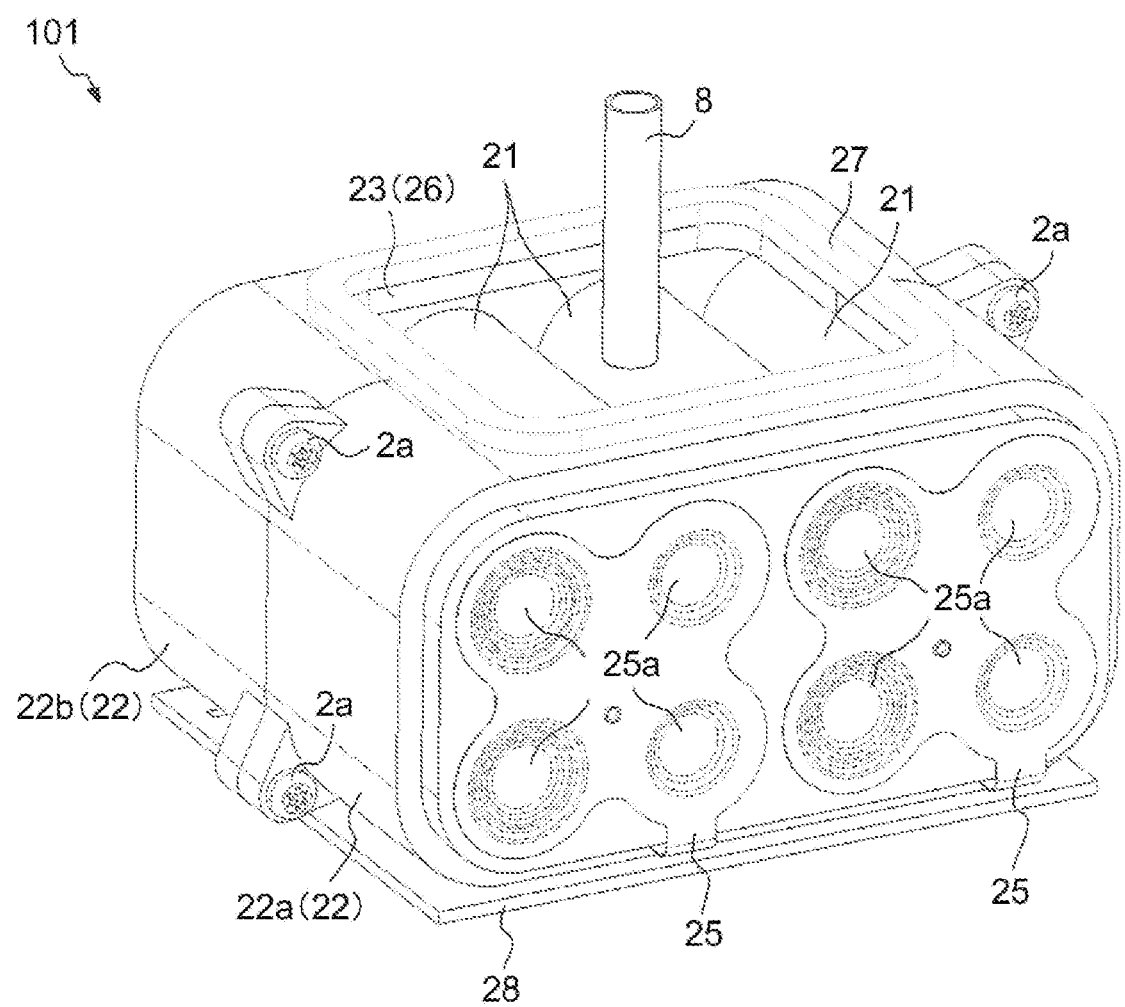
FIG. 10 is a perspective view showing a battery block of a battery pack according to an embodiment of the present technology.

Specifically, after accommodation of the battery cell group into the battery holder 22, as shown in FIG. 10, the coating agent is injected from the first opening portion 26 formed in the battery holder 22 into the battery holder 22 via an injection pipe 8.

Since the coating agent is injected after accommodation of the battery cell group into the battery holder 22, the terminal portions A, B of each battery cell 21 and the terminal portion joint 25a are in a joined state, and the coating agent is not injected between the terminal portions A, B and the terminal portion joint 25a. On the other hand, coating agents as a first sealant and a second sealant are injected between the peripheral end faces of the terminal portions A, B and the battery holder 22.

The type of the coating agent is not particularly limited, and those usually used for molding a battery pack can be used appropriately. Examples of those include a coating agent mainly containing silicone resin and a coating agent mainly containing a fluorine-based resin. In consideration that the battery cell 21 generates heat, it is also conceivable to use a heat resistant coating agent. As the heat resistant coating agent, for example, one mainly containing silicon dioxide, zirconium silicate, or zirconium dioxide can be used.

According to the battery pack 101 of the second embodiment as described above, the battery cell group is covered with the coating agents as the first sealant and the second sealant, and includes the first O-ring 7 and the second O-ring 4. Therefore, even in a use environment in which foreign matters such as water and dust exist, it is possible to prevent the foreign matter, particularly water, from entering into the battery pack case 3 and the battery holder 22.

As a result, it is possible to prevent not only deterioration in the battery cell 21 in the battery block 2, but also deterioration in the terminal portion tab 25 accommodated in the battery pack case 3 and deterioration in the substrate 28 accommodated in the battery block 2 due to immersion. This can lead to extension of the life of the battery pack 101.

Further, in addition to the waterproof structure formed by the first O-ring 7, the coating agents as the first sealant and the second sealant, and the second O-ring 4, the battery pack 101 according to the present technology has the heat dissipation structure formed by the first opening portion 26 and the second opening portion 35, and it is thus possible to prevent deterioration in the battery cell 21, and further, deterioration in the battery pack 101, due to heat generation of the battery cell 21.

In the battery pack 101 according to the second embodiment, the method for covering the battery cell group with the coating agent is not particularly limited, and examples thereof include various methods such as a method of applying the coating agent to the battery cell group by using a sprayer such as a spray.

Although the entire periphery of the battery cell group is covered with the coating agent in the battery pack 101 shown in FIG. 10, the coating agent may only fill at least the space between the peripheral end face of each of the terminal portions A, B of each battery cell 21 and the battery holder 22.

Next, a third embodiment of the battery pack according to the present technology will be described with reference to FIG. 11. A battery pack 201 according to the third embodiment differs from the battery pack 1 according to the first embodiment in that the first sealant 5 and the second sealant 6 are not formed in the substantially disc shape and are potting agents. Meanwhile, the other configurations are the same as those of the battery pack 1 according to the first embodiment, so that the same reference symbols are given, and the description thereof will be omitted. Note that FIG. 11 is a view showing a step of forming a first sealant and a second sealant by using a potting agent, and in view of the visibility, the terminal portion tab 25 is not shown.

Figure 11:
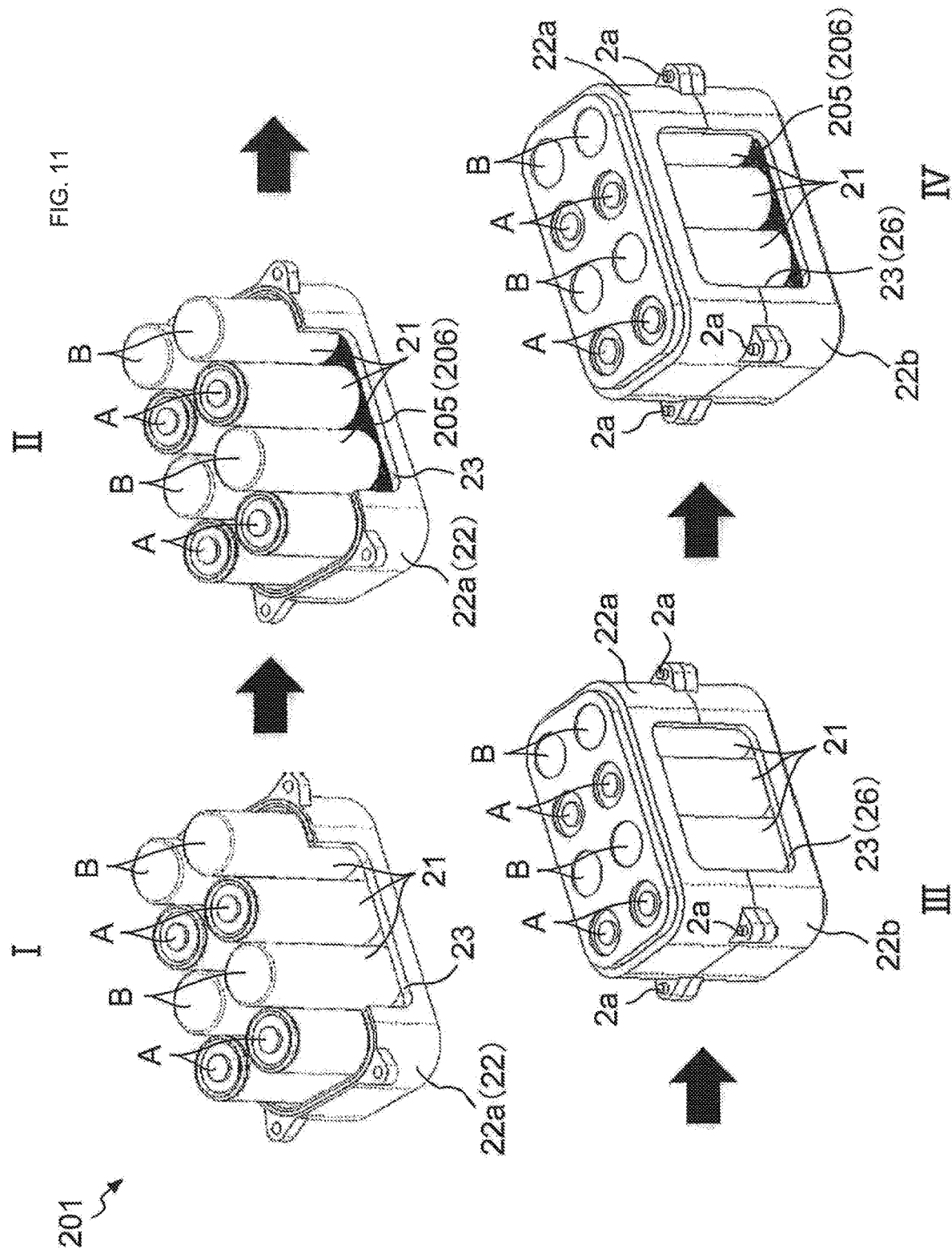
FIG. 11 is a perspective view showing a battery block of a battery pack according to an embodiment of the present technology.

In the battery pack 201 according to the third embodiment, first, each battery cell 21 is arranged with respect to the half body 22a forming the battery holder 22 (I in FIG. 11).

Thereafter, the space between each of the terminal portions A, B of each battery cell 21 and the inner side surface of the half body 22a is filled with a potting agent (II in FIG. 11). After curing of the potting agent, the half body 22b is combined with the half body 22a so as to cover the battery cell group, and thereafter the half body 22a and the half body 22b are inverted (III in FIG. 11). Then, the space between each of the terminal portions A, B on the other surface side of each battery cell 21 and the inner side surface of the half body 22b is filled with the potting agent (IV in FIG. 11).

In this manner, a first sealant 205 and a second sealant 206 made of the potting agents are molded between the peripheral end faces of the terminal portions A, B of each battery cell 21 and the inner side surface of the half body 22a.

Here, the type of the potting agent is not particularly limited, and examples thereof include a silicone resin, a modified silicone resin, an epoxy resin, and the like.

According to the battery pack 201 of the third embodiment as described above, the first sealant and the second sealant as the potting agents are molded between the peripheral end faces of the terminal portions A, B of each battery cell 21 and the battery holder 22. Therefore, even in a use environment in which foreign matters such as water and dust exist, it is possible to prevent the foreign matter, particularly water, from entering into the battery pack case 3 and the battery holder 22.

As a result, it is possible to prevent not only deterioration in the battery cell 21 in the battery block 2, but also deterioration in the terminal portion tab 25 accommodated in the battery pack case 3 and deterioration in the substrate 28 accommodated in the battery block 2 due to immersion. This can lead to extension of the life of the battery pack 101.

Further, in addition to the waterproof structure formed by the first O-ring 7, the potting agents as the first sealant and the second sealant, and the second O-ring 4, the battery pack 201 according to the present technology has the heat dissipation structure formed by the first opening portion 26 and the second opening portion 35, and it is thus possible to prevent deterioration in the battery cell 21, and further, deterioration in the battery pack 201, due to heat generation of the battery cell 21.

Figure 12:
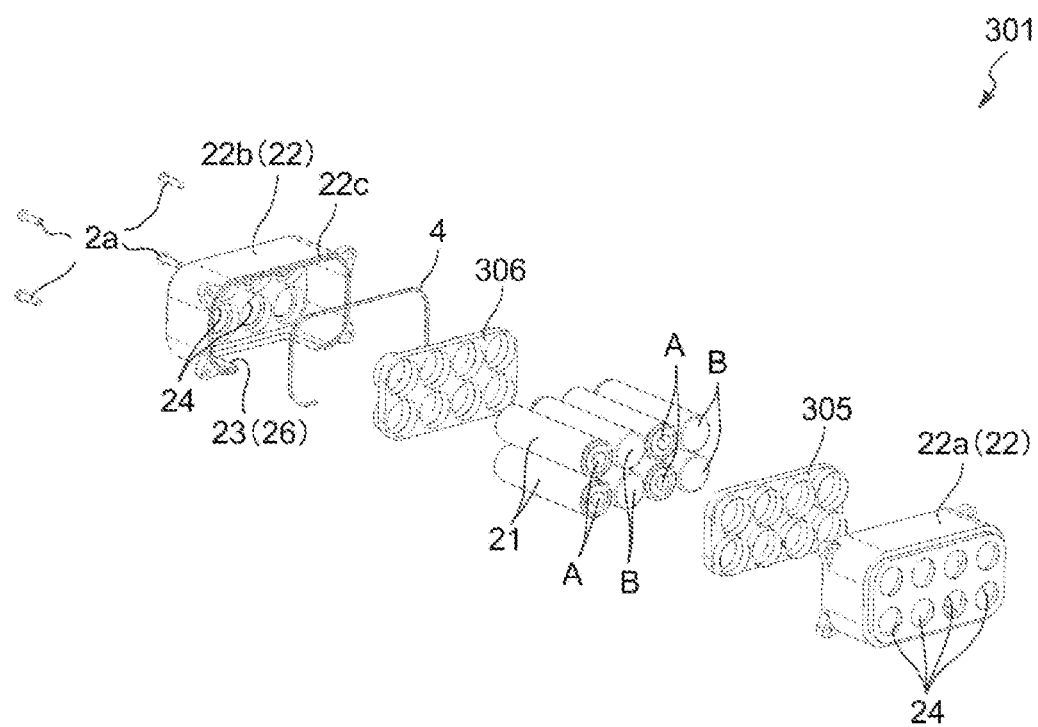
FIG. 12 is an exploded perspective view showing a battery block of a battery pack according to an embodiment of the present technology.

Next, a fourth embodiment of the battery pack according to the present technology will be described with reference to FIG. 12. A battery pack 301 according to the fourth embodiment differs from the battery pack 1 according to the first embodiment in that the first sealant 5 and the second sealant 6 are an integrally molded elastic sheet. Meanwhile, the other configurations are the same as those of the battery pack 1 according to the first embodiment, so that the same reference symbols are given, and the description thereof will be omitted.

In the battery pack 301 according to the fourth embodiment, in the battery pack 1 according to the first embodiment, the four first sealants 5 and the four second sealants 6 provided on one end side of the battery cell group are integrated to form a first elastic sheet 305. Further, in the battery pack 1 according to the first embodiment, the four first sealants 5 and the four second sealants 6 provided on the other end side of the battery cell group are integrated to form the second elastic sheet 306.

The method for molding the first elastic sheet 305 and the second elastic sheet 306 is not particularly limited, and examples thereof include an insertion molding method using a molding material.

According to the battery pack 301 of the above fourth embodiment, the first O-ring 7 is provided between the half body 31a and the half body 31b constituting the battery pack case 3, the first elastic sheet 305 and the second elastic sheet 306 are fixed between the terminal portions A, B of each battery cell 21 and the battery holder 22, and further, the second O-ring 4 is provided between the half body 22a and the half body 22b constituting the battery holder 22.

Therefore, even in a use environment in which foreign matters such as water and dust exist, it is possible to prevent the foreign matter, particularly water, from entering into the battery pack case 3 and the battery holder 22.

As a result, it is possible to prevent not only deterioration in the battery cell 21 in the battery block 2, but also deterioration in the terminal portion tab 25 accommodated in the battery pack case 3 and deterioration in the substrate 28 accommodated in the battery block 2 due to immersion. This can lead to extension of the life of the battery pack 1.

Further, in addition to the waterproof structure formed by the first O-ring 7, the first elastic sheet 305, the second elastic sheet 306, and the second O-ring 4, the battery pack 301 according to the present technology has the heat dissipation structure formed by the first opening portion 26 and the second opening portion 35, and it is thus possible to prevent deterioration in the battery cell 21, and further, deterioration in the battery pack 301, due to heat generation of the battery cell 21.

Next, a fifth embodiment of the battery pack according to the present technology will be described with reference to FIG. 13. A battery pack 401 according to the fifth embodiment differs from the battery pack 1 according to the first embodiment in that a battery holder 422 has a third opening portion 426 and includes a second gasket 427, in that a battery pack case 403 has a fourth opening portion 435, and in that a second O-ring 404 is subdivided. Meanwhile, the other configurations are the same as those of the battery pack 1 according to the first embodiment, so that the same reference symbols are given, and the description thereof will be omitted.

In the battery pack 401 according to an embodiment of the present technology, each of the half bodies 422a, 422b is formed with a rectangular second window portion 423 opened toward the insertion surface of the battery cell group with respect to the side surface orthogonal to the surface formed with the window portion 23.

By combining the half bodies 422a, 422b, the second window portion 423 of the half body 422a and the second window portion 423 of the half body 422b are combined to form the third opening portion 426. As a result, a part of the battery cell group is exposed to the outside of the battery holder 22 not only through the first opening portion 26 but also through the third opening portion 426.

In addition, each of the half bodies 422a, 422b is combined so as to sandwich the second gasket 427 formed in the substantially O shape between the second window portion 423 of the half body 422a and the second window portion 423 of the half body 422b. The second gasket 427 is disposed so as to cover the peripheral edge of the third opening portion 426.

In the battery pack 401 according to an embodiment of the present technology, each of the half bodies 422a, 422b includes the second window portion 423, and hence the fitting surface of each of the half bodies 422a, 422b is subdivided into a first fitting surface 428 formed in a substantially C shape and a second fitting surface 429 formed in a substantially arc shape.

Along with this, in the battery pack 401, the second O-ring 404 is also subdivided into a third O-ring 441 formed in the substantially C shape and a fourth O-ring 442 formed in the substantially arc shape.

Moreover, in the battery pack 401 according to the present technology, the battery pack case 403 is formed of a pair of half bodies 431a, 431b.

In the battery pack 401, the second opening portion 35 and the fourth opening portion 435 are formed in the half body 431b. The fourth opening portion 435 includes one or a plurality of slits 435a, each slit 435a is disposed at predetermined intervals along a direction vertical to the longitudinal direction of the battery pack 1 (a direction of an arrow Y in FIG. 13), and each slit 435a is cut along the width direction of the battery pack 1 (a depth direction in the page of FIG. 13).

Figure 13:
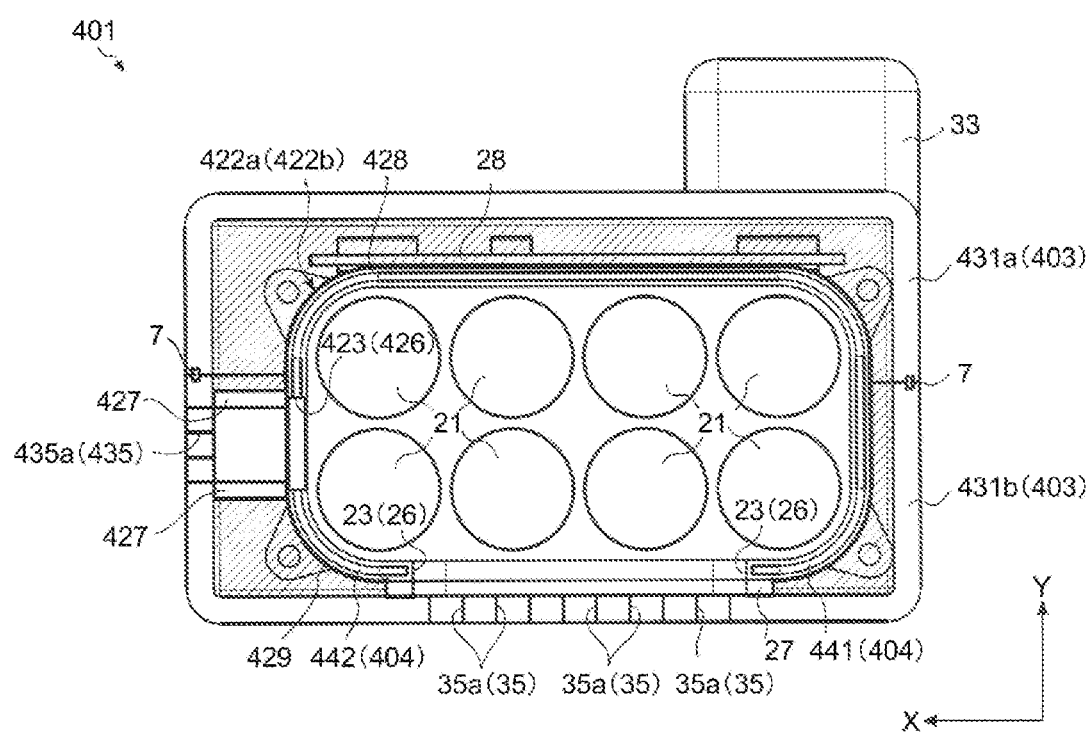
FIG. 13 is a sectional view of a battery pack according to an embodiment of the present technology.

In FIG. 13, the number of slits 435a is one, but the number thereof is not particularly limited.

In the assembled state of the battery pack 401, such a fourth opening portion 435 faces the third opening portion 426 in the longitudinal direction of the battery pack 401 (a direction of an arrow X in FIG. 13).

That is, in the assembled state of the battery pack 401, a part of each battery cell 21 is exposed to the outside of the battery pack 401 through the third opening portion 426 and the fourth opening portion 435.

The battery pack 401 according to the fifth embodiment, as in the battery pack 1 according to the first embodiment, even in a use environment in which foreign matters such as water and dust exist, it is possible to prevent the foreign matter, particularly water, from entering into the battery pack case 3 and the battery holder 22.

As a result, it is possible to prevent not only deterioration in the battery cell 21 in the battery block 2, but also deterioration in the terminal portion tab 25 accommodated in the battery pack case 3 and deterioration in the substrate 28 accommodated in the battery block 2 due to immersion. This can lead to extension of the life of the battery pack 1.

Further, in addition to the waterproof structure formed by the first O-ring 7, the second O-ring 404, the first sealant 5, and the second sealant 6, the battery pack 401 according to the present technology has the heat dissipation structure formed by the first opening portion 26 and the second opening portion 35, and it is thus possible to prevent deterioration in the battery cell 21, and further, deterioration in the battery pack 401, due to heat generation of the battery cell 21.

Additionally, in the battery pack 401 according to the present technology, the heat dissipation structure formed by the third opening portion 426 and the fourth opening portion 435 is added, and it is thus possible to more reliably prevent deterioration in the battery cell 21, and further, deterioration in the battery pack 401, due to heat generation of the battery cell 21.

In the battery pack 301 shown in FIG. 13, two heat dissipation structures are provided, but the number thereof is not particularly limited. That is, the third opening portion 426 and the fourth opening portion 435 may be formed not only on the side surface of the battery pack 301 but also on the upper surface side of the battery pack 301. Along with this, the second O-ring 404 may also be configured to be subdivided into two or more second O-rings.

Next, a sixth embodiment of the battery pack according to the present technology will be described with reference to FIG. 14. A battery pack 501 according to the sixth embodiment differs from the battery pack 1 according to the first embodiment in that the arrangement relationship between the second O-ring 4 and the gasket 27. Meanwhile, the other configurations are the same as those of the battery pack 1 according to the first embodiment, so that the same reference symbols are given, and the description thereof will be omitted.

Figure 14:
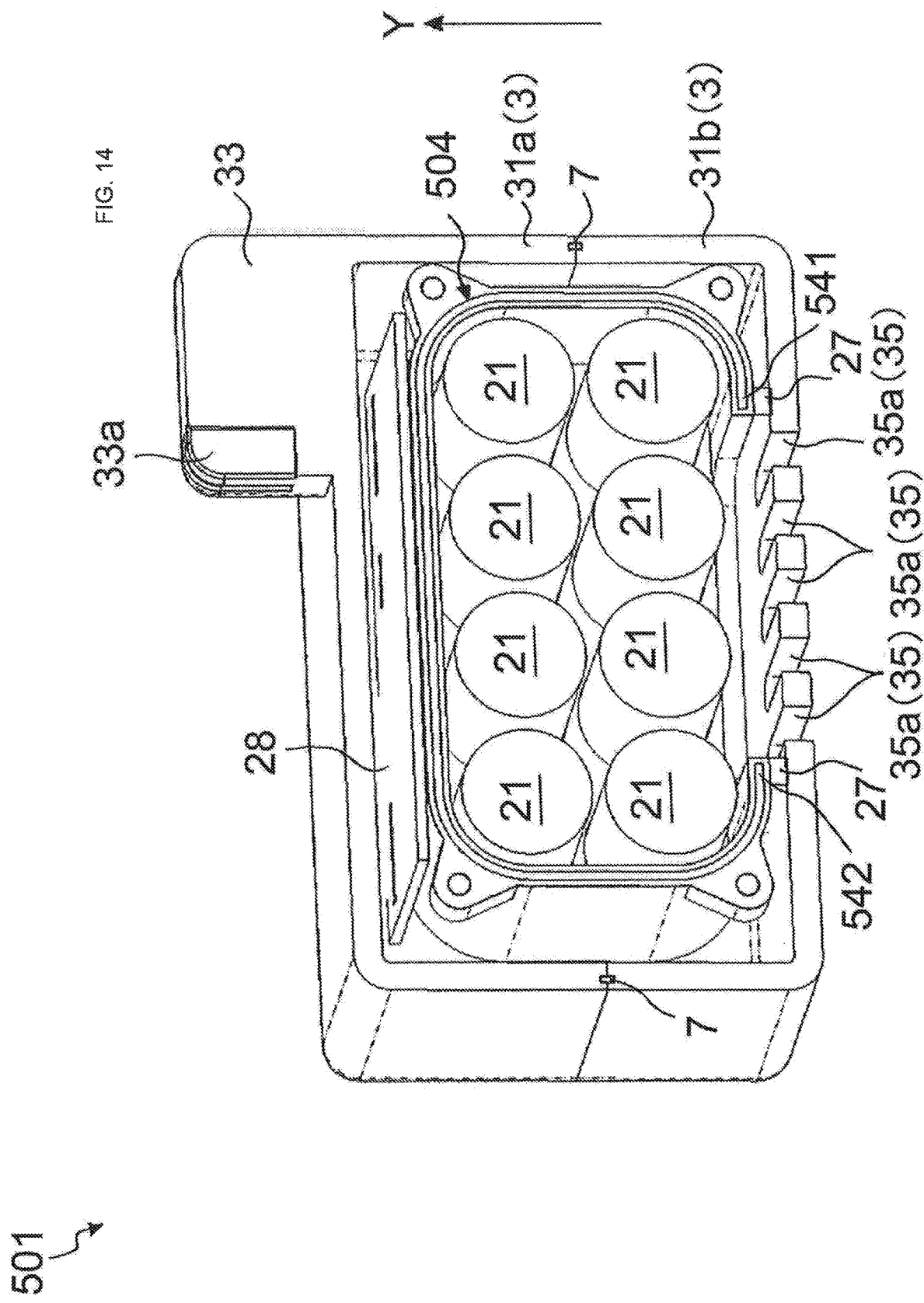
FIG. 14 is a sectional view of a battery pack according to an embodiment of the present technology.

FIG. 14 is a sectional view of a battery pack 501 according to a sixth embodiment cut along the longitudinal direction of the battery pack 501.

As shown in FIG. 14, in the battery pack 501 according to the sixth embodiment, both end portions 541, 542 of an O-ring 504 do not contact the gasket 27 and are disposed in a direction vertical to the longitudinal direction of the battery pack 501 (a direction of an arrow Y in FIG. 14) so as to overlap with the gasket 27.

The battery pack 501 according to the sixth embodiment, as in the battery pack 1 according to the first embodiment, even in a use environment in which foreign matters such as water and dust exist, it is possible to prevent the foreign matter, particularly water, from entering into the battery pack case 3 and the battery holder 22.

As a result, it is possible to prevent not only deterioration in the battery cell 21 in the battery block 2, but also deterioration in the terminal portion tab 25 accommodated in the battery pack case 3 and deterioration in the substrate 28 accommodated in the battery block 2 due to immersion. This can lead to extension of the life of the battery pack 1.

Further, in addition to the waterproof structure formed by the first O-ring 7, the second O-ring 504, the first sealant 5, and the second sealant 6, the battery pack 501 according to the present technology has the heat dissipation structure formed by the first opening portion 26 and the second opening portion 35, and it is thus possible to prevent deterioration in the battery cell 21, and further, deterioration in the battery pack 501, due to heat generation of the battery cell 21.

Since both end portions 541, 542 of the O-ring 504 are disposed in the direction vertical to the longitudinal direction of the battery pack 501 so as to overlap with the gasket 27 without contacting the gasket 27, it is possible to more reliably prevent foreign matter, particularly water, from entering between the battery pack case 3 and the battery holder 22 from the first opening portion 26.

Next, a modification 601 of battery pack according to the sixth embodiment will be described with reference to FIG. 15.

Figure 15:
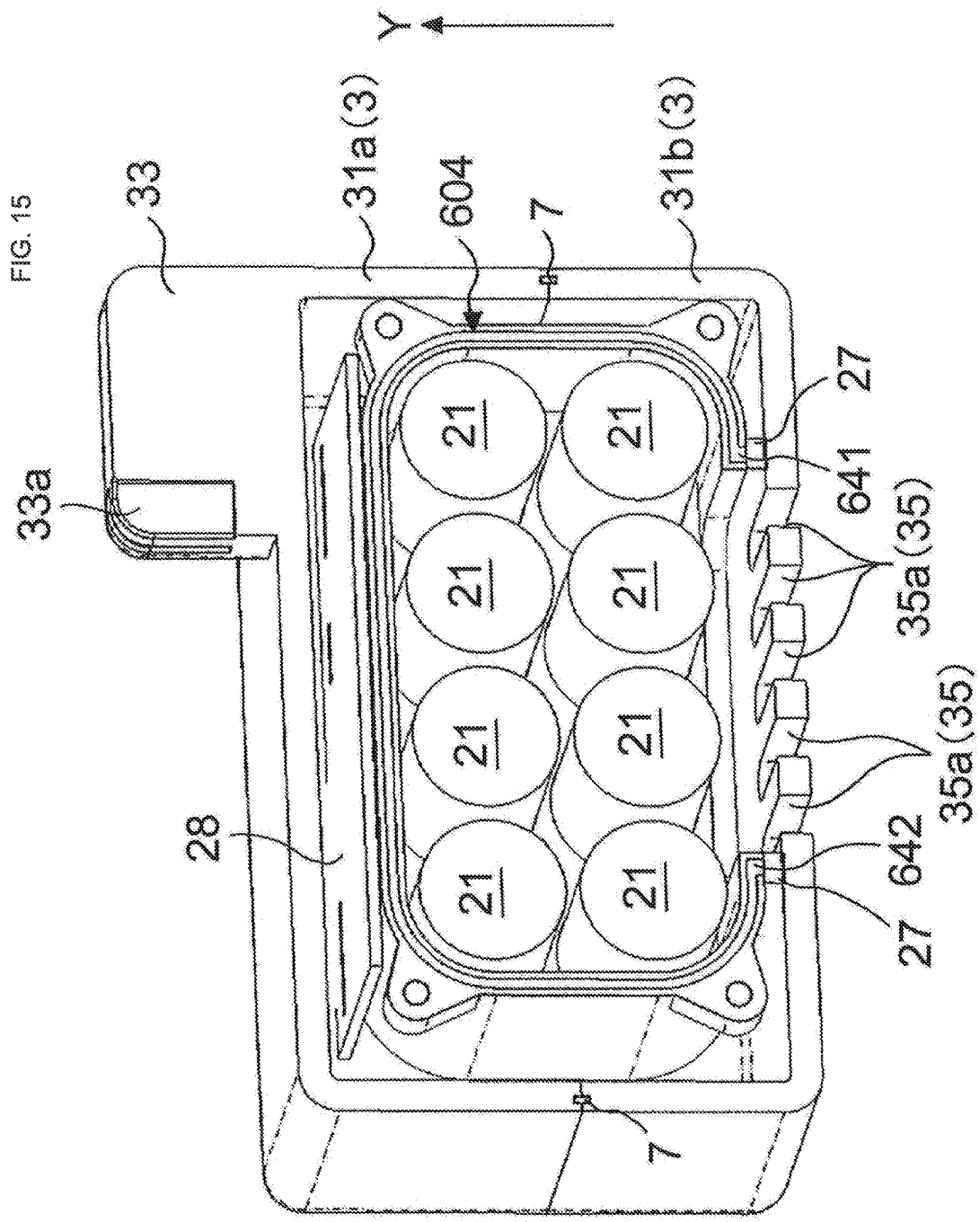
FIG. 15 is a sectional view of a modification of the embodiment shown in FIG. 14.

In this modification 601, both end portions 641, 642 of the second O-ring 604 overlap with each other in a direction vertical to the longitudinal direction of the battery pack 601 (a direction of an arrow Y in FIG. 15). Further, each of the end portions 641, 642 is formed to be thick, and is configured to adhere to the gasket 27 in the assembled state of the battery pack 601.

The modification 601 of the battery pack according to the sixth embodiment, as in the battery pack 1 according to the first embodiment, even in a use environment in which foreign matters such as water and dust exist, it is possible to prevent the foreign matter, particularly water, from entering into the battery pack case 3 and the battery holder 22.

As a result, it is possible to prevent not only deterioration in the battery cell 21 in the battery block 2, but also deterioration in the terminal portion tab 25 accommodated in the battery pack case 3 and deterioration in the substrate 28 accommodated in the battery block 2 due to immersion. This can lead to extension of the life of the battery pack 1.

Further, in addition to the waterproof structure formed by the first O-ring 7, the second O-ring 604, the first sealant 5, and the second sealant 6, the battery pack 601 according to the present technology has the heat dissipation structure formed by the first opening portion 26 and the second opening portion 35, and it is thus possible to prevent deterioration in the battery cell 21, and further, deterioration in the battery pack 601, due to heat generation of the battery cell 21.

Further, since both end portions 641, 642 of the O-ring 604 are configured to adhere to the gasket 27, entry of foreign matter, particularly water, between the battery pack case 3 and the battery holder 22 from the first opening portion 26 can be more reliably prevented.

The present technology also provides an electronic device including a battery pack and supplied with electric power from the battery pack, the battery pack at least including a battery block including a battery cell, and a battery holder accommodating the battery cell and having at least one opening portion, a battery pack case accommodating the battery block and having at least one opening portion, a first sealant disposed at least between a peripheral end face of one terminal portion of the battery cell and the battery holder, and a second sealant disposed at least between a peripheral end face of the other terminal portion of the battery cell and the battery holder, wherein the first sealant is fixed by the peripheral end face of the one terminal portion and the battery holder, and the second sealant is fixed by the peripheral end face of the other terminal portion and the battery holder.

The battery pack according to each of the embodiments shown in FIGS. 1 to 14 is applicable to the battery pack in the electronic device. Therefore, the description of the battery pack is omitted here.

Examples of the electronic device according to the present technology include a notebook type computer, a personal digital assistant (PDA), a mobile phone, a cordless phone slave, a video movie, a digital still camera, an electronic book, an electronic dictionary, a music player, a radio, a headphone, a game machine, a navigation system, a memory card, a pacemaker, a hearing aid, a power tool, an electric shaver, a refrigerator, an air conditioner, a television, a stereo, a water heater, a microwave oven, a dishwasher, a washing machine, a drier, lighting equipment, a toy, medical equipment, a robot, a road conditioner, and a traffic light.

The battery pack according to embodiments of the present technology can be used to supply electric power to an electric vehicle. Examples of the electric vehicle include a railway vehicle, a golf cart, an electric cart, and an electric car (including a hybrid car), and the battery is used as a driving power supply or an auxiliary power supply for those vehicles.

Figure 16:
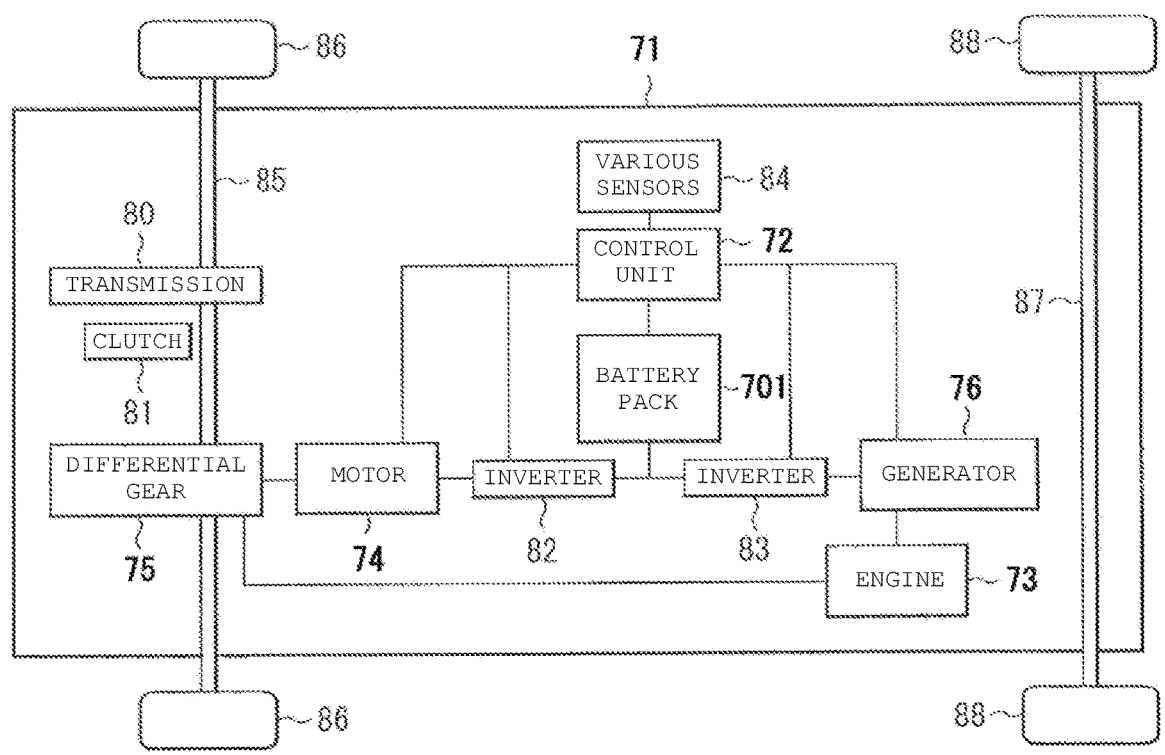
FIG. 16 is a block diagram showing a configuration of an application example (electric vehicle) of the battery pack according to an embodiment of the present technology.

FIG. 16 shows a block configuration of a hybrid car that is an example of the electric vehicle. For example, this electric vehicle includes a metal casing 71 including therein a control unit 72, an engine 73, a battery pack 701, a driving motor 74, a differential gear 75, a generator 76, a transmission 80, a clutch 81, inverters 82, 83, and various sensors 84. Besides the above, the electric vehicle includes, for example, a front wheel drive shaft 85 and front wheels 86 connected to the differential gear 75 and the transmission 80, a rear wheel drive shaft 87, and rear wheels 88.

This electric vehicle can travel, for example, by using either the engine 73 or the motor 74 as a drive source. The engine 73 is a main power source, and is a gasoline engine or the like, for example. When the engine 73 is used as the power source, the driving force (rotational force) of the engine 73 is transmitted to the front wheels 86 or the rear wheels 88 via the differential gear 75, the transmission 80, and the clutch 81. The rotational force of the engine 73 is also transmitted to the generator 76. The generator 76 generates AC power by using the rotational force of the generator 76, and the AC power is converted into DC power via the inverter 83, which is accumulated in the battery pack 701. Meanwhile, when the motor 74 being a conversion unit or a converter is used as the power source, electric power (DC power) supplied from the battery pack 701 is converted into AC power via the inverter 82, and the motor 74 is driven by using the AC power. The driving force (rotational force) converted from the electric power by the motor 74 is transmitted to the front wheels 86 or the rear wheels 88 via the differential gear 75, the transmission 80, and the clutch 81.

When the electric vehicle decelerates via a braking mechanism (not shown), a resistance force at the time of deceleration is transmitted to the motor 74 as a rotational force, and the motor 74 may be caused to generate AC power by using the rotational force. This AC power is converted into DC power via the inverter 82, and the DC regenerated power is preferably stored into the battery pack 701.

The control unit (controller) 72 controls the operation of the entire electric vehicle, and includes a CPU or a processor, for example.

The battery pack 701 may be connected to an external power supply, and may be capable of storing electric power by receiving electric power from the external power supply. The various sensors 84 are used, for example, to control the speed of the engine 73 and to control an opening degree (throttle opening degree) of a throttle valve (not shown). The various sensors 84 include, for example, a speed sensor, an acceleration sensor, and an engine speed sensor.

The battery pack according to each of the embodiments shown in FIGS. 1 to 14 is applicable to the battery pack 701. Therefore, the description of the battery pack is omitted here.

Although the case has been described where the electric vehicle is a hybrid car, the electric vehicle may be a vehicle (an electric car) that operates by using only the battery pack 701 and the motor 74 without using the engine 73.

The battery pack according to embodiments of the present technology is also applicable as a power supply for a power storage system.

Figure 17:
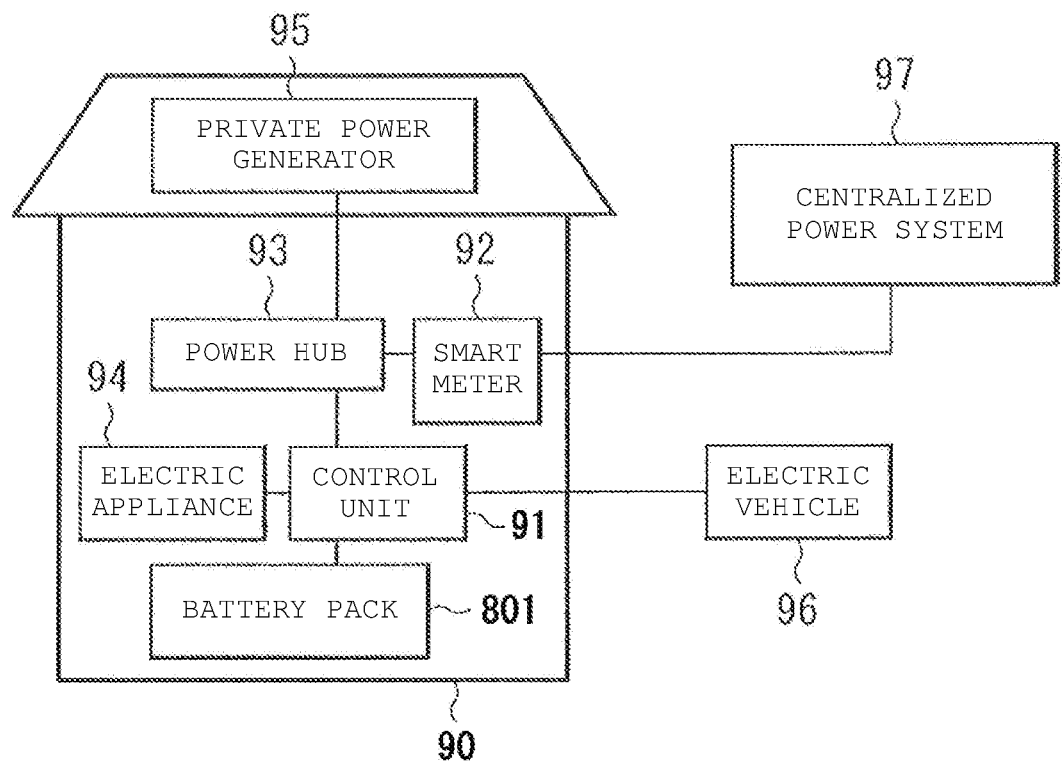
FIG. 17 is a block diagram showing a configuration of an application example (a power storage system) of a battery pack according to an embodiment of the present technology.

FIG. 17 shows a block configuration of the power storage system. This power storage system includes, for example, a battery pack 801, a control unit 91, a smart meter 92, and a power hub 93 inside a house 90 such as a general house and a commercial building.

The battery pack 801 is connected to, for example, an electric appliance 94 installed inside the house 90 and, is connectable to an electric vehicle 96 stopped outside the house 90. Further, the battery pack 801 is connected to a private power generator 95 installed in the house 90 via the power hub 93, for example, and is connectable to an external centralized power system 97 via the smart meter 92 via the power hub 93.

The battery packs according to each of the embodiments shown in FIGS. 1 to 14 is applicable to the battery pack 801. Therefore, the description of the battery pack is omitted here.

Note that the electric appliance 94 includes, for example, one or more home electric appliances such as a refrigerator, an air conditioner, a television, and a water heater. The private power generator 95 is, for example, one type or two or more types of solar power generators, wind power generators, and the like. The electric vehicle 96 is, for example, one type or two or more types of electric cars, electric bikes, hybrid cars, and the like. The centralized power system 97 is, for example, one type or two or more types of thermal power plants, nuclear power plants, hydraulic power plants, wind power plants, and the like.

The control unit (controller) 91 controls the operation of the entire power storage system (including the use state of the battery pack 801), and includes a CPU or a processor, for example. The smart meter 92 is, for example, a network compatible wattmeter installed in the house 90 of an electric power consumer, and can communicate with a power supplier. Accordingly, the smart meter 92 controls the balance between demand and supply in the house 90, for example, while communicating with the outside, thereby enabling efficient and stable supply of energy.

In this power storage system, for example, electric power is stored into the battery pack 801 from the centralized power system 97, which is an external power supply, via the smart meter 92 and the power hub 93, and electric power from a private power generator 95, which is an independent power supply, is supplied to the battery pack 801 via the power hub 93. The electric power accumulated in the battery pack 801 is supplied to the electric appliance 94 and the electric vehicle 96 in accordance with an instruction of the control unit 91, to make the electric appliance 94 operable and the electric vehicle 96 chargeable. That is, the power storage system is a system that enables electric power to be stored and supplied into the house 90 by using the battery pack 801.

The electric power stored into the battery pack 801 can be used in a freely selected manner. For this reason, for example, electric power is stored into the battery pack 801 from the centralized power system 97 in the middle of the night when the electricity usage is lower, and the electric power stored into the battery pack 801 can be used during the day when the electricity usage is higher.

The power storage system described above may be installed for each one house (one household), or may be installed for each two or more houses (two or more households).

The battery pack according to embodiments of the present technology is also applicable as a power supply for power tools such as an electric drill, an electric saw, a rolling machine such as a rammer, an electric agricultural machine such as a lawn mower.

Figure 18:
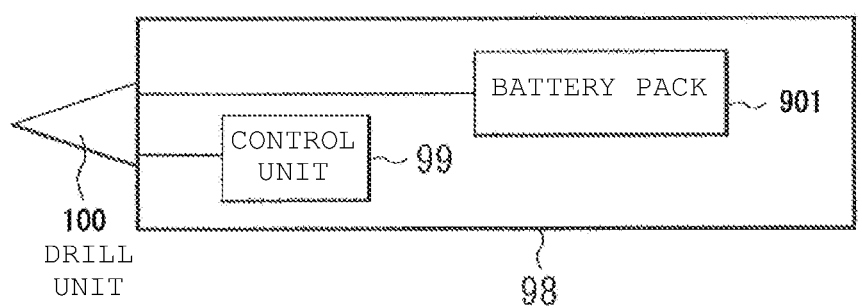
FIG. 18 is a block diagram showing a configuration of an application example (a power tool) of the battery pack according to an embodiment of the present technology.

FIG. 18 shows a block configuration of the power tool. This power tool is, for example, an electric drill, and includes a control unit 99 and a power supply 901 inside a tool body 98 formed of a plastic material or the like. For example, a drill unit 100 being a movable unit is operably (rotatably) attached to the tool body 98.

The control unit (controller) 99 controls the operation of the entire power tool (including the use state of the power supply 901), and includes a CPU or a processor, for example. This control unit 99 supplies electric power from the power supply 901 to the drill unit 100 in accordance with operation of an operation switch (not shown).

The battery pack according to each of the embodiments shown in FIGS. 1 to 14 is applicable to the power supply 901. Therefore, the description of the battery pack is omitted here.

The present technology is described below in further detail according to an embodiment:

(1) A battery pack at least including: a battery block including a battery cell, and a battery holder accommodating the battery cell and having at least one opening portion; a battery pack case accommodating the battery block and having at least one opening portion; a first sealant disposed at least between a peripheral end face of one terminal portion of the battery cell and the battery holder; and a second sealant disposed at least between a peripheral end face of the other terminal portion of the battery cell and the battery holder, wherein the first sealant is fixed by the peripheral end face of the one terminal portion and the battery holder, and the second sealant is fixed by the peripheral end face of the other terminal portion and the battery holder.

(2) The battery pack described in (1), wherein at least one opening portion in the battery holder and at least one opening portion in the battery pack case are disposed to face each other.

(3) The battery pack described in (1) or (2), wherein a first opening portion in the battery holder is formed in a bottom surface of the battery holder, a second opening portion in the battery pack case is formed in a bottom surface of the battery pack case, and the first opening portion and the second opening portion are disposed to face each other, and a third opening portion in the battery holder is formed in at least one side surface of the battery holder, a fourth opening portion in the battery pack case is formed in at least one side surface of the battery pack case, and the third opening portion and the fourth opening portion are disposed to face each other.

(4) The battery pack described in any one of (1) to (3), wherein the first sealant and the second sealant are elastic bodies having an opening.

(5) The battery pack described in any one of (1) to (3), wherein the first sealant and the second sealant are potting agents.

(6) The battery pack described in any one of (1) to (5), wherein a clearance is provided between the battery cell and the battery holder.

(7) The battery pack described in any one of (1) to (6), including a gasket disposed between the battery holder and the battery pack case.

(8) The battery pack described in (7), wherein the gasket is disposed between the battery holder and a bottom surface of the battery pack case.

(9) The battery pack described in (7), wherein a first opening portion in the battery holder is formed in a bottom surface of the battery holder, a second opening portion in the battery pack case is formed in a bottom surface of the battery pack case, and the first opening portion and the second opening portion are disposed to face each other, a third opening portion in the battery holder is formed in at least one side surface of the battery holder, a fourth opening portion in the battery pack case is formed in at least one side surface of the battery pack case, and the third opening portion and the fourth opening portion are disposed to face each other, and the gasket is disposed between the battery holder and the bottom surface of the battery pack case and further disposed between the battery holder and at least one side surface of the battery pack case.

(10) The battery pack described in any one of (1) to (9), wherein the battery pack case includes a fitting surface, and a first O-ring disposed on the fitting surface of the battery pack case.

(11) The battery pack described in any one of (1) to (10), wherein the battery holder includes a fitting surface, and a second O-ring disposed on the fitting surface of the battery holder.

(12) The battery pack described in (11), wherein the second O-ring is subdivided into a plurality of second O-rings, and at least two second O-rings of the plurality of second O-rings are arranged separately.

(13) The battery pack described in any one of (1) to (12), wherein at least a part of the battery cell is covered with a coating agent.

(14) The battery pack described in any one of (1) to (13), including: a battery cell group including a plurality of the battery cells; a first elastic sheet in which a plurality of elastic bodies each having an opening between one end of the battery cell group and the battery holder are integrated; and a second elastic sheet in which a plurality of elastic bodies each having an opening between the other end of the battery cell group and the battery holder are integrated.

(15) The battery pack described in any one of (1) to (6), including a gasket disposed between the battery holder and the battery pack case, wherein the battery holder includes a fitting surface, and a second O-ring disposed on the fitting surface of the battery holder, and the gasket and the second O-ring overlap without contacting each other.

(16) The battery pack described in any one of (1) to (6), including a gasket disposed between the battery holder and the battery pack case, wherein the battery holder includes a fitting surface, and a second O-ring disposed on the fitting surface of the battery holder, and the gasket and the second O-ring overlap while contacting each other.

Further, as the electronic device including the battery pack according to the present technology, it is possible to take configurations as follows.

(17) An electronic device including a battery pack and supplied with electric power from the battery pack, the battery pack at least including a battery block including a battery cell, and a battery holder accommodating the battery cell and having at least one opening portion, a battery pack case accommodating the battery block and having at least one opening portion, a first sealant disposed at least between a peripheral end face of one terminal portion of the battery cell and the battery holder, and a second sealant disposed at least between a peripheral end face of the other terminal portion of the battery cell and the battery holder, wherein the first sealant is fixed by the peripheral end face of the one terminal portion and the battery holder, and the second sealant is fixed by the peripheral end face of the other terminal portion and the battery holder.

(18) The electronic device described in (17), wherein at least one opening portion in the battery holder and at least one opening portion in the battery pack case are disposed to face each other.

(19) The electronic device described in (17) or (18), wherein a first opening portion in the battery holder is formed in a bottom surface of the battery holder, a second opening portion in the battery pack case is formed in a bottom surface of the battery pack case, and the first opening portion and the second opening portion are disposed to face each other, and a third opening portion in the battery holder is formed in at least one side surface of the battery holder, a fourth opening portion in the battery pack case is formed in at least one side surface of the battery pack case, and the third opening portion and the fourth opening portion are disposed to face each other.

(20) The electronic device described in any one of (17) to (19), wherein the first sealant and the second sealant are elastic bodies having an opening.

(21) The electronic device described in any one of (17) to (19), wherein the first sealant and the second sealant are potting agents.

(22) The electronic device described in any one of (17) to (21), wherein a clearance is provided between the battery cell and the battery holder.

(23) The electronic device described in any one of (17) to (22), including a gasket disposed between the battery holder and the battery pack case.

(24) The electronic device described in (23), wherein the gasket is disposed between the battery holder and a bottom surface of the battery pack case.

(25) The electronic device described in (23), wherein a first opening portion in the battery holder is formed in a bottom surface of the battery holder, a second opening portion in the battery pack case is formed in a bottom surface of the battery pack case, and the first opening portion and the second opening portion are disposed to face each other, a third opening portion in the battery holder is formed in at least one side surface of the battery holder, a fourth opening portion in the battery pack case is formed in at least one side surface of the battery pack case, and the third opening portion and the fourth opening portion are disposed to face each other, and the gasket is disposed between the battery holder and the bottom surface of the battery pack case and further disposed between the battery holder and at least one side surface of the battery pack case.

(26) The electronic device described in any one of (17) to (25), wherein the battery pack case includes a fitting surface, and a first O-ring disposed on the fitting surface of the battery pack case.

(27) The electronic device described in any one of (17) to (26), wherein the battery holder includes a fitting surface, and a second O-ring disposed on the fitting surface of the battery holder.

(28) The electronic device described in (27), wherein the second O-ring is subdivided into a plurality of second O-rings, and at least two second O-rings of the plurality of second O-rings are arranged separately.

(29) The electronic device described in any one of (17) to (28), wherein at least a part of the battery cell is covered with a coating agent.

(30) The electronic device described in any one of (17) to (29), including: a battery cell group including a plurality of the battery cells; a first elastic sheet in which a plurality of elastic bodies each having an opening between one end of the battery cell group and the battery holder are integrated; and a second elastic sheet in which a plurality of elastic bodies each having an opening between the other end of the battery cell group and the battery holder are integrated.

(31) The electronic device described in any one of (17) to (23), including a gasket disposed between the battery holder and the battery pack case, wherein the battery holder includes a fitting surface, and a second O-ring disposed on the fitting surface of the battery holder, and the gasket and the second O-ring overlap without contacting each other.

(32) The electronic device described in any one of (17) to (23), including a gasket disposed between the battery holder and the battery pack case, wherein the battery holder includes a fitting surface, and a second O-ring disposed on the fitting surface of the battery holder, and the gasket and the second O-ring overlap while contacting each other.

Further, as the power storage system including the battery pack according to the present technology, it is possible to take configurations as follows.

(33) A power storage system including a battery pack that at least includes: a battery block including a battery cell, and a battery holder accommodating the battery cell and having at least one opening portion; a battery pack case accommodating the battery block and having at least one opening portion; a first sealant disposed at least between a peripheral end face of one terminal portion of the battery cell and the battery holder; and a second sealant disposed at least between a peripheral end face of the other terminal portion of the battery cell and the battery holder, wherein the first sealant is fixed by the peripheral end face of the one terminal portion and the battery holder, and the second sealant is fixed by the peripheral end face of the other terminal portion and the battery holder.

(34) The power storage system described in (33), wherein at least one opening portion in the battery holder and at least one opening portion in the battery pack case are disposed to face each other.

(35) The power storage system described in (33) or (34), wherein a first opening portion in the battery holder is formed in a bottom surface of the battery holder, a second opening portion in the battery pack case is formed in a bottom surface of the battery pack case, and the first opening portion and the second opening portion are disposed to face each other, and a third opening portion in the battery holder is formed in at least one side surface of the battery holder, a fourth opening portion in the battery pack case is formed in at least one side surface of the battery pack case, and the third opening portion and the fourth opening portion are disposed to face each other.

(36) The power storage system described in any one of (33) to (35), wherein the first sealant and the second sealant are elastic bodies having an opening.

(37) The power storage system described in any one of (33) to (35), wherein the first sealant and the second sealant are potting agents.

(38) The power storage system described in any one of (33) to (37), wherein a clearance is provided between the battery cell and the battery holder.

(39) The power storage system described in any one of (33) to (38), including a gasket disposed between the battery holder and the battery pack case.

(40) The power storage system described in (39), wherein the gasket is disposed between the battery holder and a bottom surface of the battery pack case.

(41) The power storage system described in (39), wherein a first opening portion in the battery holder is formed in a bottom surface of the battery holder, a second opening portion in the battery pack case is formed in a bottom surface of the battery pack case, and the first opening portion and the second opening portion are disposed to face each other, a third opening portion in the battery holder is formed in at least one side surface of the battery holder, a fourth opening portion in the battery pack case is formed in at least one side surface of the battery pack case, and the third opening portion and the fourth opening portion are disposed to face each other, and the gasket is disposed between the battery holder and the bottom surface of the battery pack case and further disposed between the battery holder and at least one side surface of the battery pack case.

(42) The power storage system described in any one of (33) to (41), wherein the battery pack case includes a fitting surface, and a first O-ring disposed on the fitting surface of the battery pack case.

(43) The power storage system described in any one of (33) to (42), wherein the battery holder includes a fitting surface, and a second O-ring disposed on the fitting surface of the battery holder.

(44) The power storage system described in (43), wherein the second O-ring is subdivided into a plurality of second O-rings, and at least two second O-rings of the plurality of second O-rings are arranged separately.

(45) The power storage system described in any one of (33) to (44), wherein at least a part of the battery cell is covered with a coating agent.

(46) The power storage system described in any one of (33) to (45), including: a battery cell group including a plurality of the battery cells; a first elastic sheet in which a plurality of elastic bodies each having an opening between one end of the battery cell group and the battery holder are integrated; and a second elastic sheet in which a plurality of elastic bodies each having an opening between the other end of the battery cell group and the battery holder are integrated.

(47) The power storage system described in any one of (33) to (39), including a gasket disposed between the battery holder and the battery pack case, wherein the battery holder includes a fitting surface, and a second O-ring disposed on the fitting surface of the battery holder, and the gasket and the second O-ring overlap without contacting each other.

(48) The power storage system described in any one of (33) to (39), including a gasket disposed between the battery holder and the battery pack case, wherein the battery holder includes a fitting surface, and a second O-ring disposed on the fitting surface of the battery holder, and the gasket and the second O-ring overlap while contacting each other.

Further, as the power tool including the battery pack according to the present technology, it is possible to take configurations as follows.

(49) A power tool including a battery pack and supplied with electric power from the battery pack, the battery pack at least including a battery block including a battery cell, and a battery holder accommodating the battery cell and having at least one opening portion, a battery pack case accommodating the battery block and having at least one opening portion, a first sealant disposed at least between a peripheral end face of one terminal portion of the battery cell and the battery holder, and a second sealant disposed at least between a peripheral end face of the other terminal portion of the battery cell and the battery holder, wherein the first sealant is fixed by the peripheral end face of the one terminal portion and the battery holder, and the second sealant is fixed by the peripheral end face of the other terminal portion and the battery holder.

(50) The power tool described in (49), wherein at least one opening portion in the battery holder and at least one opening portion in the battery pack case are disposed to face each other.

(51) The power tool described in (49) or (50), wherein a first opening portion in the battery holder is formed in a bottom surface of the battery holder, a second opening portion in the battery pack case is formed in a bottom surface of the battery pack case, and the first opening portion and the second opening portion are disposed to face each other, and a third opening portion in the battery holder is formed in at least one side surface of the battery holder, a fourth opening portion in the battery pack case is formed in at least one side surface of the battery pack case, and the third opening portion and the fourth opening portion are disposed to face each other.

(52) The power tool described in any one of (49) to (51), wherein the first sealant and the second sealant are elastic bodies having an opening.

(53) The power tool described in any one of (49) to (51), wherein the first sealant and the second sealant are potting agents.

(54) The power tool described in any one of (49) to (53), wherein a clearance is provided between the battery cell and the battery holder.

(55) The power tool described in any one of (49) to (53), including a gasket disposed between the battery holder and the battery pack case.

(56) The power tool described in (55), wherein the gasket is disposed between the battery holder and a bottom surface of the battery pack case.

(57) The power tool described in (55), wherein a first opening portion in the battery holder is formed in a bottom surface of the battery holder, a second opening portion in the battery pack case is formed in a bottom surface of the battery pack case, and the first opening portion and the second opening portion are disposed to face each other, a third opening portion in the battery holder is formed in at least one side surface of the battery holder, a fourth opening portion in the battery pack case is formed in at least one side surface of the battery pack case, and the third opening portion and the fourth opening portion are disposed to face each other, and the gasket is disposed between the battery holder and the bottom surface of the battery pack case and further disposed between the battery holder and at least one side surface of the battery pack case.

(58) The power tool described in any one of (49) to (56), wherein the battery pack case includes a fitting surface, and a first O-ring disposed on the fitting surface of the battery pack case.

(59) The power tool described in any one of (49) to (58), wherein the battery holder includes a fitting surface, and a second O-ring disposed on the fitting surface of the battery holder.

(60) The power tool described in (59), wherein the second O-ring is subdivided into a plurality of second O-rings, and at least two second O-rings of the plurality of second O-rings are arranged separately.

(61) The power tool described in any one of (49) to (60), wherein at least a part of the battery cell is covered with a coating agent.

(62) The power tool described in any one of (49) to (61), including: a battery cell group including a plurality of the battery cells; a first elastic sheet in which a plurality of elastic bodies each having an opening between one end of the battery cell group and the battery holder are integrated; and a second elastic sheet in which a plurality of elastic bodies each having an opening between the other end of the battery cell group and the battery holder are integrated.

(63) The power tool described in any one of (49) to (55), including a gasket disposed between the battery holder and the battery pack case, wherein the battery holder includes a fitting surface, and a second O-ring disposed on the fitting surface of the battery holder, and the gasket and the second O-ring overlap without contacting each other.

(64) The power tool described in any one of (49) to (55), including a gasket disposed between the battery holder and the battery pack case, wherein the battery holder includes a fitting surface, and a second O-ring disposed on the fitting surface of the battery holder, and the gasket and the second O-ring overlap while contacting each other.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:
   a battery block including a battery cell and a battery holder configured to accommodate the battery cell, wherein the battery holder includes at least a first opening portion;
   a battery pack case configured to accommodate the battery block and having at least a second opening portion;
   a first sealant disposed at least between a first peripheral end face of a first terminal portion of the battery cell and the battery holder;
   a second sealant disposed at least between a second peripheral end face of a second terminal portion of the battery cell and the battery holder, and
   a gasket disposed between the battery holder and the battery pack case, wherein the gasket is disposed between the battery holder and a bottom surface of the battery pack case
   wherein the first sealant is fixed by the first peripheral end face of the first terminal portion and the battery holder, and
   wherein the second sealant is fixed by the second peripheral end face of the second terminal portion and the battery holder,
   wherein the first opening portion in the battery holder is formed in a bottom surface of the battery holder, the second opening portion in the battery pack case is formed in a bottom surface of the battery pack case, and the first opening portion and the second opening portion are disposed to face each other,
   wherein a third opening portion in the battery holder is formed in at least one side surface of the battery holder, a fourth opening portion in the battery pack case is formed in at least one side surface of the battery pack case, and the third opening portion and the fourth opening portion are disposed to face each other, and
   wherein the battery holder includes a pair of half bodies that have a substantially inverted U shape in cross section.

2. The battery pack according to claim 1, wherein the first opening portion in the battery holder and the second opening portion in the battery pack case are disposed to face each other.

3. The battery pack according to claim 1, wherein the first sealant and the second sealant include elastic bodies having an opening.

4. The battery pack according to claim 1, wherein the first sealant and the second sealant include potting agents.

5. The battery pack according to claim 1, wherein a clearance is provided between the battery cell and the battery holder.

6. The battery pack according to claim 1, wherein the battery pack case includes a fitting surface, and a first O-ring disposed on the fitting surface of the battery pack case.

7. The battery pack according to claim 1, wherein the battery holder includes a fitting surface, and a second O-ring disposed on the fitting surface of the battery holder.

8. The battery pack according to claim 7, wherein the second O-ring includes a plurality of O-rings, and at least two O-rings are arranged separately.

9. The battery pack according to claim 1, wherein at least a part of the battery cell is covered with a coating agent.

10. The battery pack according to claim 1, further comprising:
    a battery cell group including a plurality of battery cells;
    a first elastic sheet including a plurality of first elastic bodies each having an opening between a first end of the battery cell group and the battery holder; and
    a second elastic sheet including a plurality of second elastic bodies each having an opening between a second end of the battery cell group and the battery holder.

11. An electronic device comprising a battery pack and configured to be supplied with electric power from the battery pack, the battery pack including:
    a battery block including a battery cell and a battery holder configured to accommodate the battery cell, wherein the battery holder includes at least a first opening portion,
    a battery pack case configured to accommodate the battery block and having at least a second opening portion,
    a first sealant disposed at least between a first peripheral end face of a first terminal portion of the battery cell and the battery holder,
    a second sealant disposed at least between a second peripheral end face of a second terminal portion of the battery cell and the battery holder, and
    a gasket disposed between the battery holder and the battery pack case, wherein the gasket is disposed between the battery holder and a bottom surface of the battery pack case
    wherein the first sealant is fixed by the first peripheral end face of the first terminal portion and the battery holder,
    wherein the second sealant is fixed by the second peripheral end face of the second terminal portion and the battery holder,
    wherein the first opening portion in the battery holder is formed in a bottom surface of the battery holder, the second opening portion in the battery pack case is formed in a bottom surface of the battery pack case, and the first opening portion and the second opening portion are disposed to face each other,
    wherein a third opening portion in the battery holder is formed in at least one side surface of the battery holder, a fourth opening portion in the battery pack case is formed in at least one side surface of the battery pack case, and the third opening portion and the fourth opening portion are disposed to face each other, and wherein the battery holder includes a pair of half bodies that have a substantially inverted U shape in cross section.

* * * * *